(12) United States Patent
Rietman

(10) Patent No.: US 10,685,587 B2
(45) Date of Patent: Jun. 16, 2020

(54) CRYPTOGRAPHIC DEVICE FOR CALCULATING A BLOCK CIPHER

(71) Applicant: KONINKLIJKE PHILIPS N.V., Eindhoven (NL)

(72) Inventor: Ronald Rietman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 243 days.

(21) Appl. No.: 15/569,564

(22) PCT Filed: Apr. 19, 2016

(86) PCT No.: PCT/EP2016/058591
§ 371 (c)(1),
(2) Date: Oct. 26, 2017

(87) PCT Pub. No.: WO2016/173882
PCT Pub. Date: Nov. 3, 2016

(65) Prior Publication Data
US 2018/0315350 A1    Nov. 1, 2018

(30) Foreign Application Priority Data
Apr. 30, 2015    (EP) .................................... 15166051

(51) Int. Cl.
*G09C 1/00*    (2006.01)
*H04L 9/00*    (2006.01)
*H04L 9/06*    (2006.01)

(52) U.S. Cl.
CPC ............... *G09C 1/00* (2013.01); *H04L 9/004* (2013.01); *H04L 9/0625* (2013.01); *H04L 2209/16* (2013.01)

(58) Field of Classification Search
None
See application file for complete search history.

(56) References Cited

U.S. PATENT DOCUMENTS

| | | | |
|---|---|---|---|
| 8,175,265 B2 | 5/2012 | Ciet et al. | |
| 9,336,160 B2 | 5/2016 | Hawkes et al. | |
| 2008/0215925 A1 | 9/2008 | Degenaro et al. | |
| 2010/0002872 A1* | 1/2010 | Shibutani | H04L 9/0631 380/28 |

(Continued)

FOREIGN PATENT DOCUMENTS

| | | |
|---|---|---|
| WO | 2009115864 A1 | 9/2009 |
| WO | 2014096117 A1 | 6/2014 |

OTHER PUBLICATIONS

Federal Information Processing Standards Publication 46-3 "Data Encryption Standard" (Year: 1999).*

(Continued)

*Primary Examiner* — Eleni A Shiferaw
*Assistant Examiner* — Bassam A Noaman

(57) ABSTRACT

A cryptographic device (100) calculates a block cipher (500) on a block cipher input (105) and produces a block cipher output (106). The block cipher calculation operates on encoded values (210). The cryptographic device includes a round function unit (140; 300) for applying the final round (118) of the multiple rounds of cryptographic processing implementing the block cipher. A first output unit (160) and second output unit (180) decodes encoded output data (132, 152).

16 Claims, 12 Drawing Sheets

(56) References Cited

U.S. PATENT DOCUMENTS

| | | | |
|---|---|---|---|
| 2012/0170739 A1* | 7/2012 | Karroumi | H04L 9/0631 |
| | | | 380/28 |
| 2012/0284533 A1 | 11/2012 | Assche et al. | |
| 2015/0215117 A1* | 7/2015 | Kim | G09C 1/00 |
| | | | 380/28 |
| 2015/0358154 A1 | 12/2015 | Morchon et al. | |
| 2016/0048689 A1* | 2/2016 | Wiener | H04L 9/004 |
| | | | 713/189 |

OTHER PUBLICATIONS

Biham et al: "Differential Fault Analysis of Secret Key Cryptosystems";Advances in Cryptology—Crypto '97, LNCS 1296, pp. 513-525, 1997.
"Digital Rights Management"; Lecture Notes in Computer Science 2696, Edited by G. Goos, J. Hartmanis, and J. Van Leeuwen, ACM CCS-9 Workshop, DRM 2002, 231 Page Document.
Chow et al: "A White-Box DES Implementation for DRM Applications"; DRM 2002, LNCS 2696, pp. 1-15, 2003.
Pascal Manet et al: "Integrated Evaluation Platform for Secured Devices"; Proceedings of the 2nd International Workshop on Reconfigurable Communication-Centric Systems-On-Chip, ReCoSoC 2006, pp. 214-220.

* cited by examiner

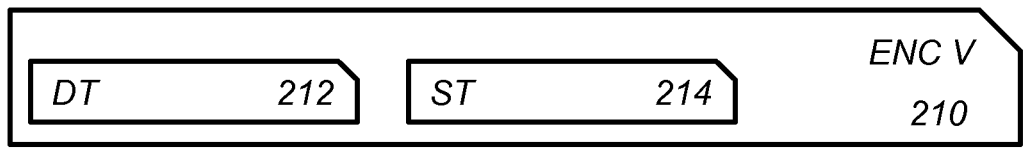
Fig. 2.1
| 213 | 215 | 211 |
|---|---|---|
| 0000 | 0000 | 11010110 |
| 0001 | 0000 | 01001111 |
| ... | ... | ... |
| 1111 | 0000 | 11001000 |
| 0000 | 0001 | 10111111 |
| ... | ... | ... |
| 1111 | 1111 | 01000100 |
Fig. 2.2
Fig. 2.3
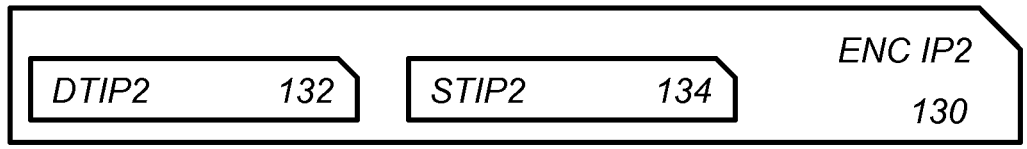
Fig. 2.4
Fig. 2.5

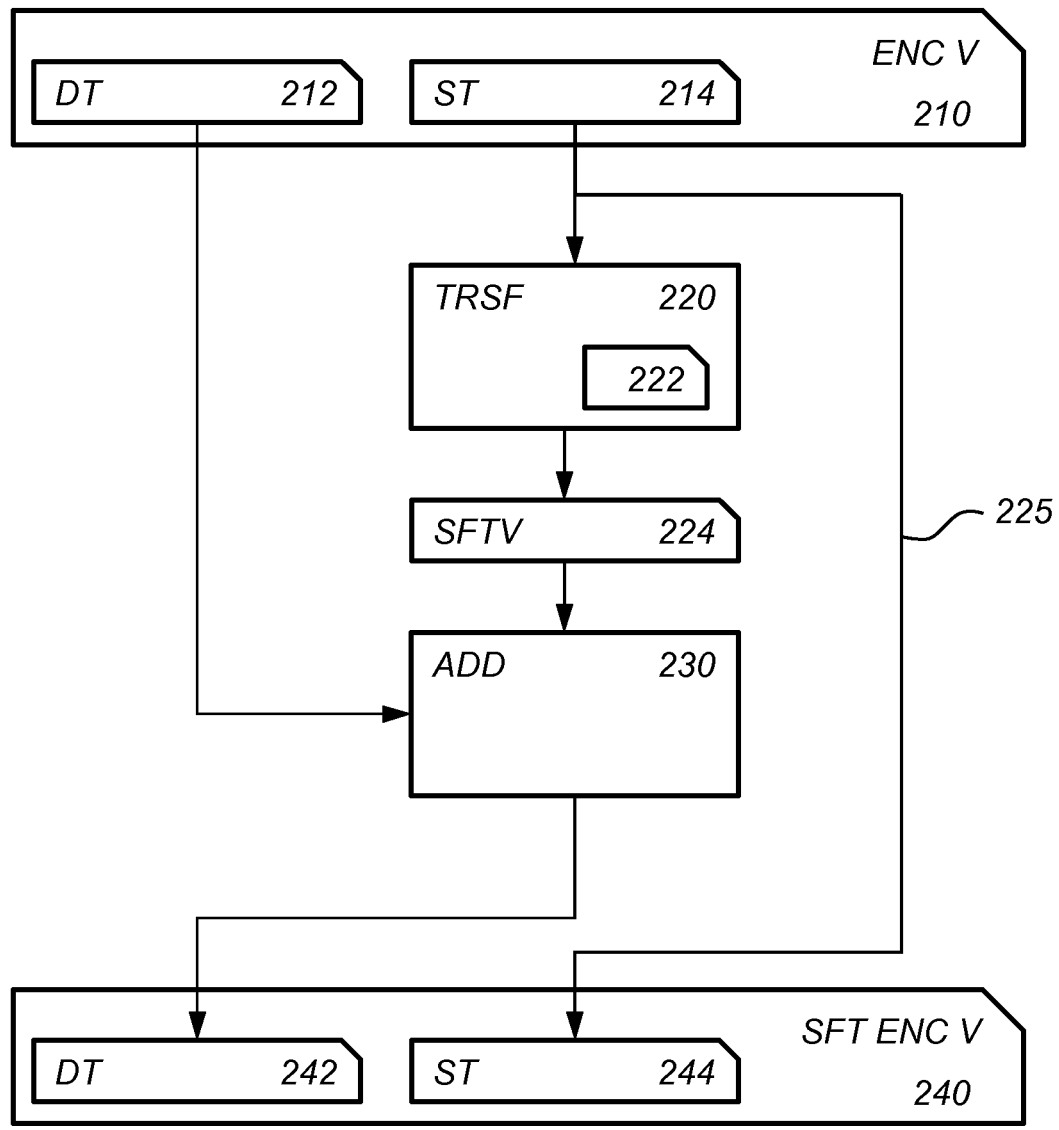
Fig. 2.6

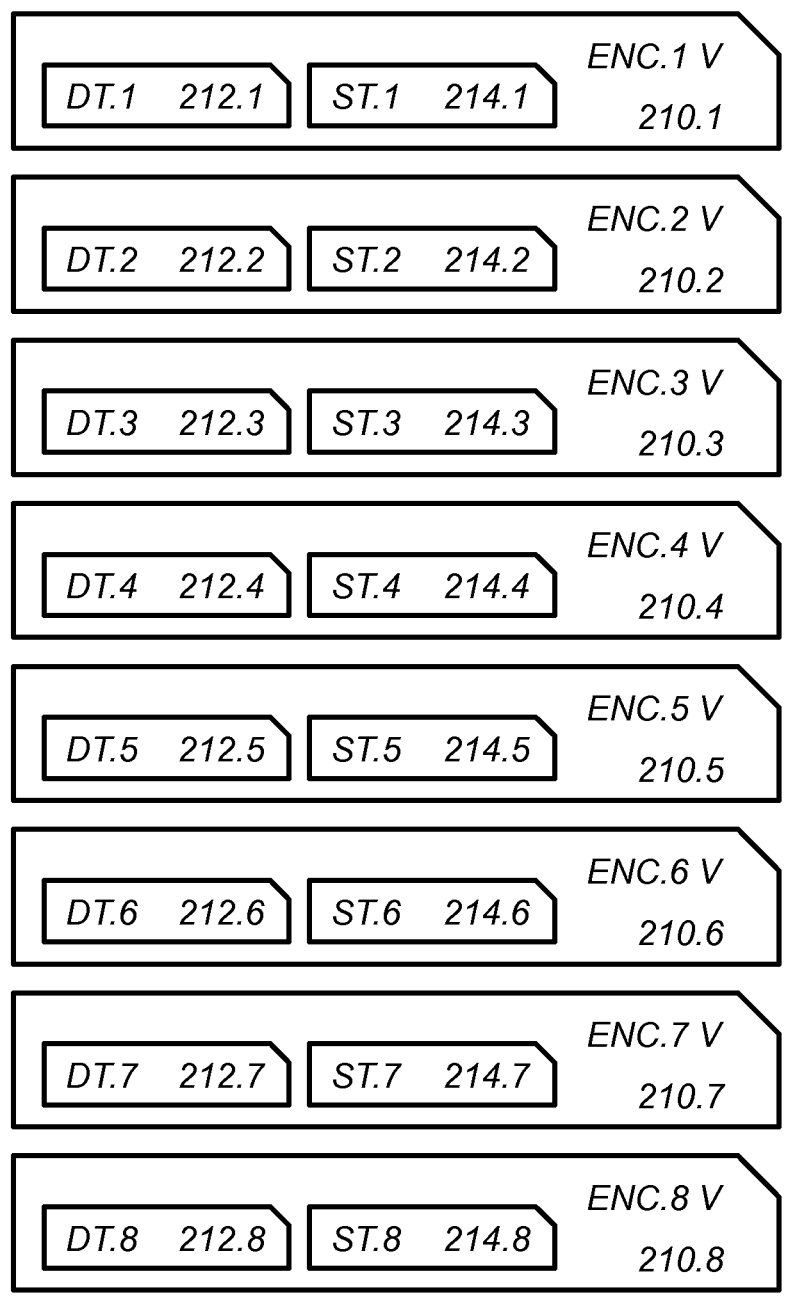
Fig. 2.7

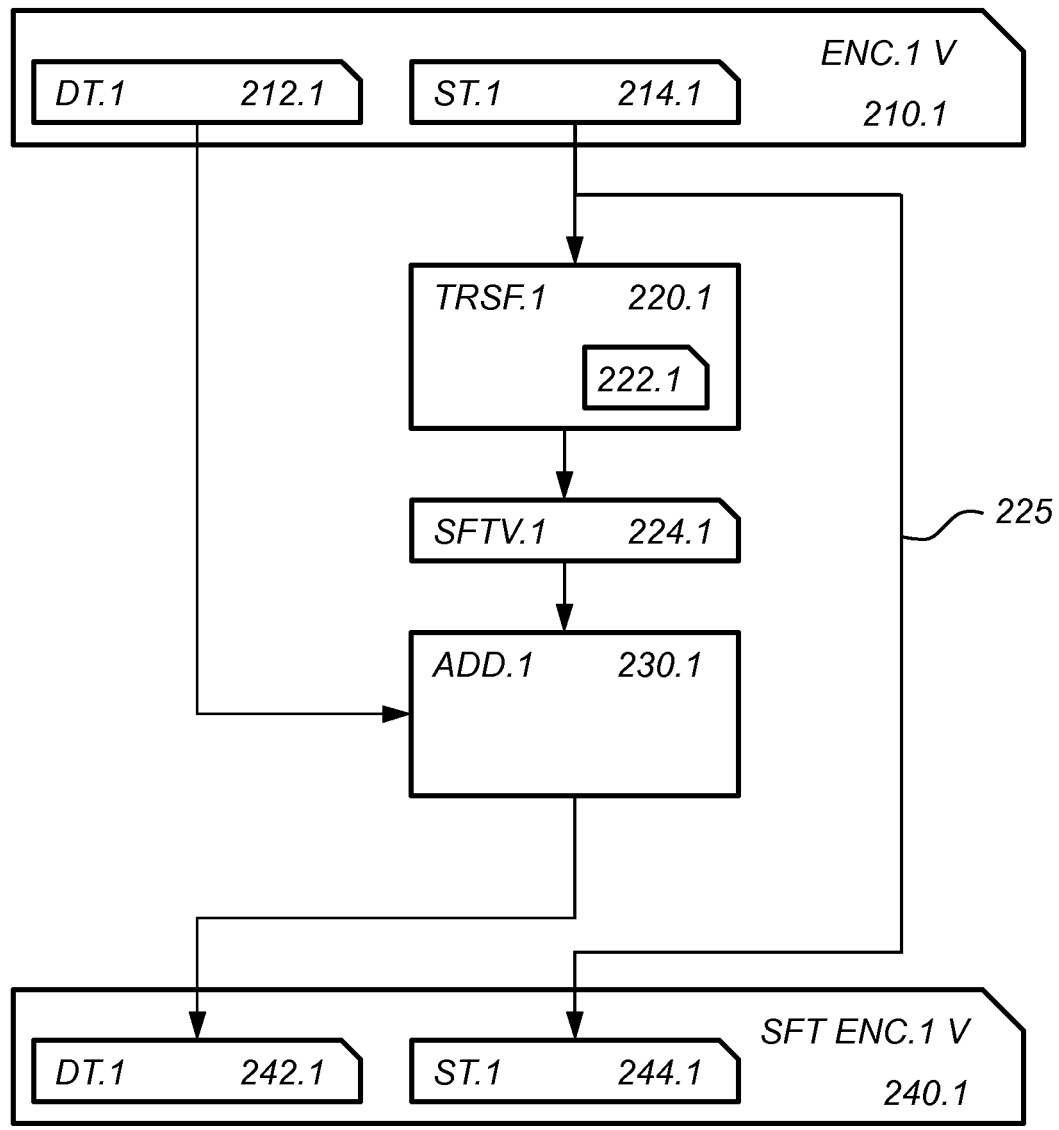
Fig. 2.8

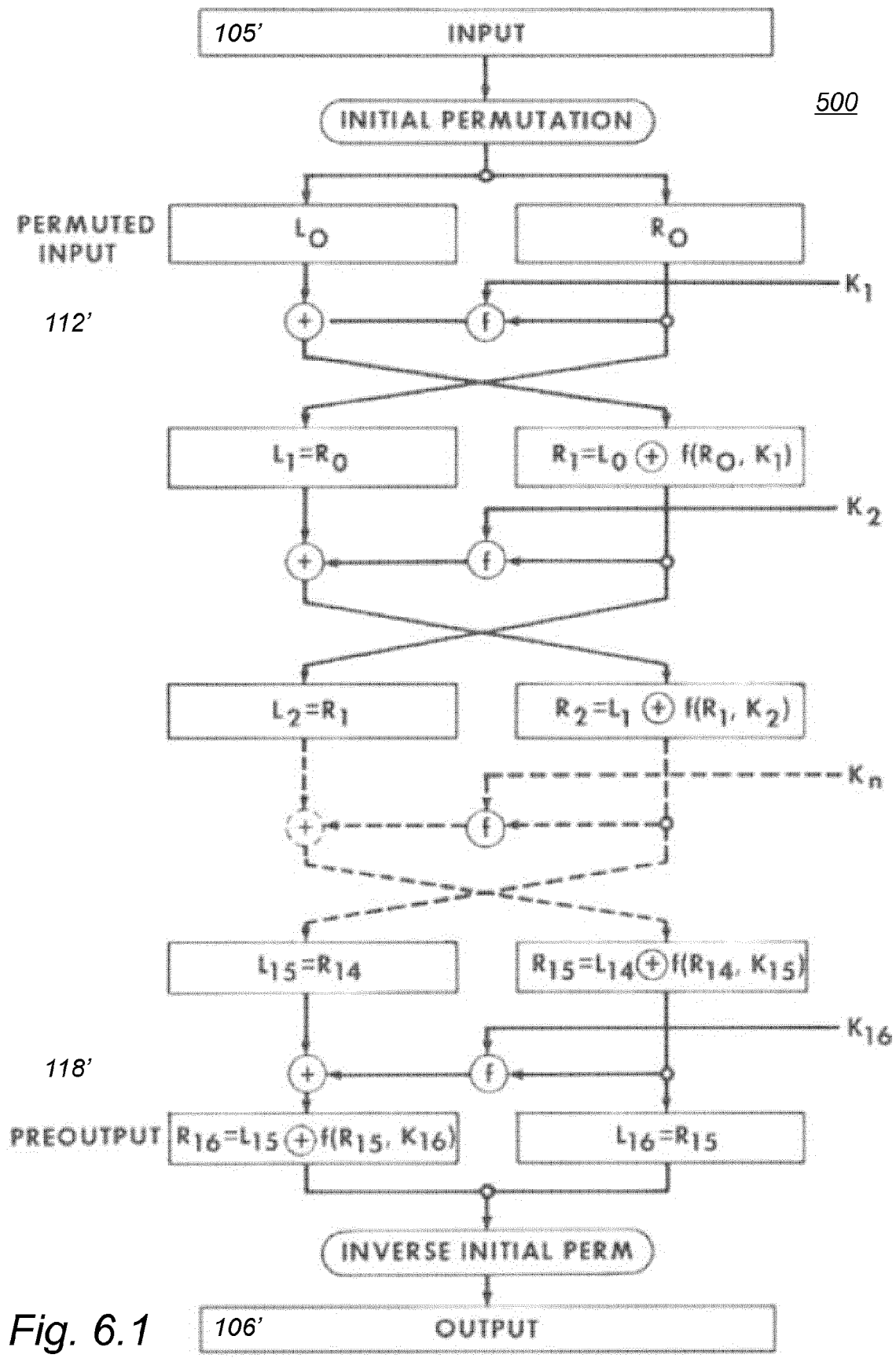
*Fig. 6.1*

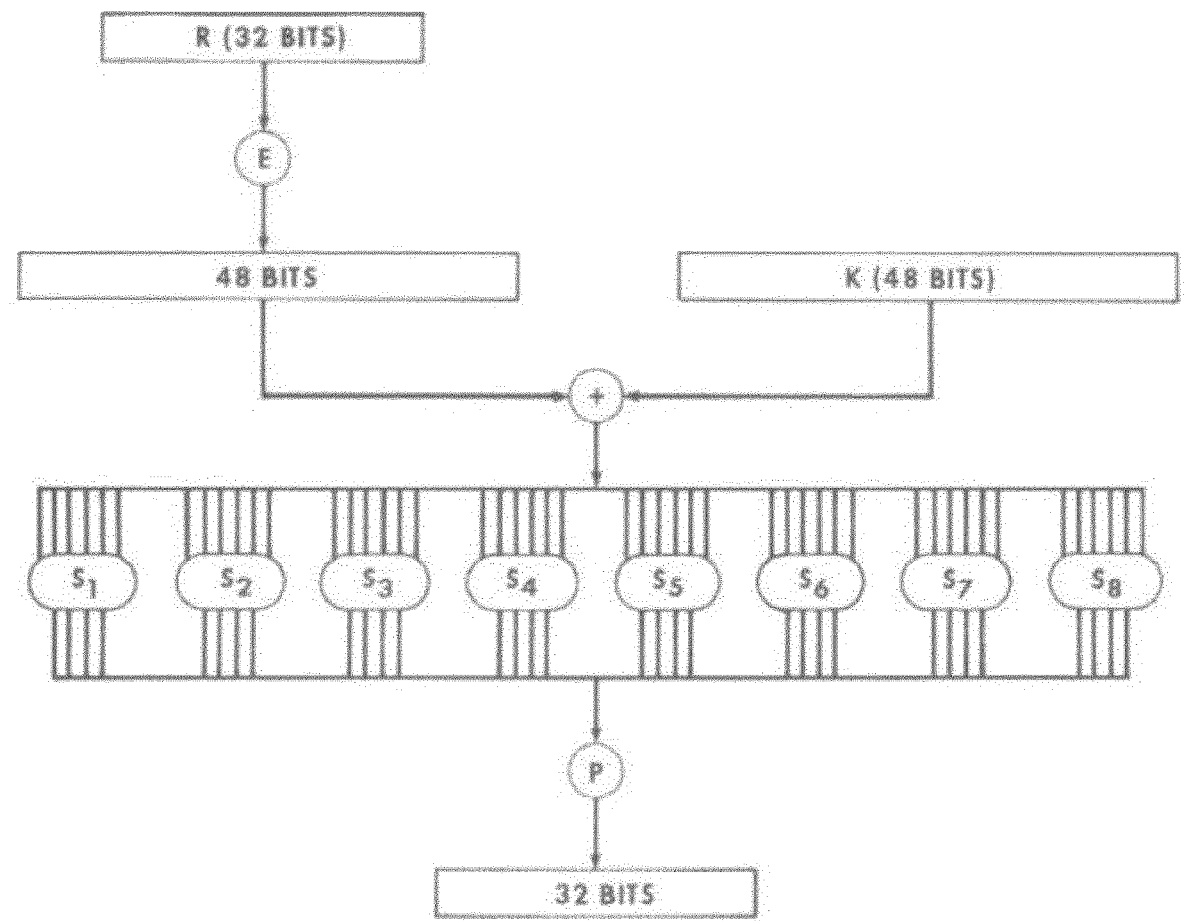
Fig. 6.2

CRYPTOGRAPHIC DEVICE FOR CALCULATING A BLOCK CIPHER

CROSS-REFERENCE TO PRIOR APPLICATIONS

This application is the U.S. National Phase application under 35 U.S.C. § 371 of International Application No. PCT/EP2016/058591, filed on Apr. 19, 2016, which claims the benefit of European Patent Application No. 15166051.1, filed on Apr. 30, 2015. These applications are hereby incorporated by reference herein.

FIELD OF THE INVENTION

The invention relates to a cryptographic device for calculating a block cipher, a cryptographic method for calculating a block cipher, a computer program, and a computer readable medium.

BACKGROUND

In the paper "A White-Box DES Implementation for DRM Applications" by S. Chow, et al. a white-box implementation of the Data Encryption Standard (DES) is presented (referred to as 'Chow' below and incorporated by reference herein). A white-box implementation is a cryptographic implementation designed to withstand an attack in the white-box context. In the white-box context, the attacker has total visibility into software implementation and execution. Nevertheless, even so the white-box implementation aims to prevent the extraction of secret keys from the program.

Chow forms an implementation of DES that consists entirely of table look-up operations. Through several intermediate methods the normal cipher is transformed to an implementation in this form. Input and output encodings are used to protect all these tables.

SUMMARY OF THE INVENTION

The inventor found that a table based implementation of block cipher may still be vulnerable to some attacks. The inventor realized that even if a key may not be directly derived from observing the variables in a white-box implementation, access to the variables may be used to execute an attack previously only known from the realm of physical attacks.

For example, in the paper "Differential Fault Analysis of Secret Key Cryptosystems" by Biham, et al. transient faults are introduced in a smart card by changing the power supply voltage causing a DES computation to produce an incorrect result. By analyzing the errors that result, information on the secret key is obtained.

The inventor had the insight that such physical fault attacks may be adapted to attack a white-box implementation. Even if it were not possible to obtain secret information from analysis of variables visible to the attacker, the attacker may be able to derive secret information by modifying encoded variables to try to emulate the physical attack.

In experiments the inventor was indeed able to recover the secret key used in the DES white-box implementations described in Chow by intentionally modifying variables. The intentionally modification of variables acts as the transient fault. The inventors found that countermeasures of increasing sophistication are able to increasingly handicap fault attacks on white-box DES implementation, or to completely avoid them altogether.

A cryptographic device for calculating a block cipher is proposed that has tamper resistance shift functions before a round function and before output units that decode encoded values. Differential fault attacks are handicapped by these functions as they restrict the modifications that can be made and what is learned from the resulting errors. The invention is defined by the independent claims; the dependent claims define advantageous embodiments.

The cryptographic device is an electronic device, and may be a mobile electronic device, e.g., a mobile phone, a set-top box, a computer, etc. The cryptographic device described herein may be applied in a wide range of practical applications. Such practical applications include banking applications, content protection systems, communication systems, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., APPLE APP STORE, GOOGLE PLAY STORE, or MICROSOFT WINDOWS STORE, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic device, FIG. 2.1 schematically shows an example of an embodiment of an encoded value, FIG. 2.2 schematically shows an example of an embodiment of an encoding, FIG. 2.3 schematically shows an example of an embodiment of a first encoded input, FIG. 2.4 schematically shows an example of an embodiment of a second encoded input, FIG. 2.5 schematically shows an example of an embodiment of an encoded output, FIG. 2.6 schematically shows an example of an embodiment of a tamper-resistance shift function, FIG. 2.7 schematically shows an example of an embodiment of a sequence of encoded sub-values, FIG. 2.8 schematically shows an example of an embodiment of a tamper-resistance shift sub-function, FIG. 3 schematically shows an example of an embodiment of a round function unit, FIG. 4 schematically shows an example of an embodiment of a first output unit, FIG. 5 schematically shows an example of an embodiment of a second output unit, FIG. 6.1 schematically shows an example of an embodiment of the DES block cipher, FIG. 6.2 schematically shows an example of an embodiment of the DES round function, FIG. 7 schematically shows an example of an embodiment of a method for calculating a block cipher, FIG. 8a schematically shows a computer readable medium having a writable part comprising a computer program according to an embodiment, FIG. 8b schematically shows a representation of a processor system according to an embodiment.

In the figures and detailed description reference numerals, acronyms, and formulas are used. Those related to FIGS. 1-5 are summarized below

Figure 1:
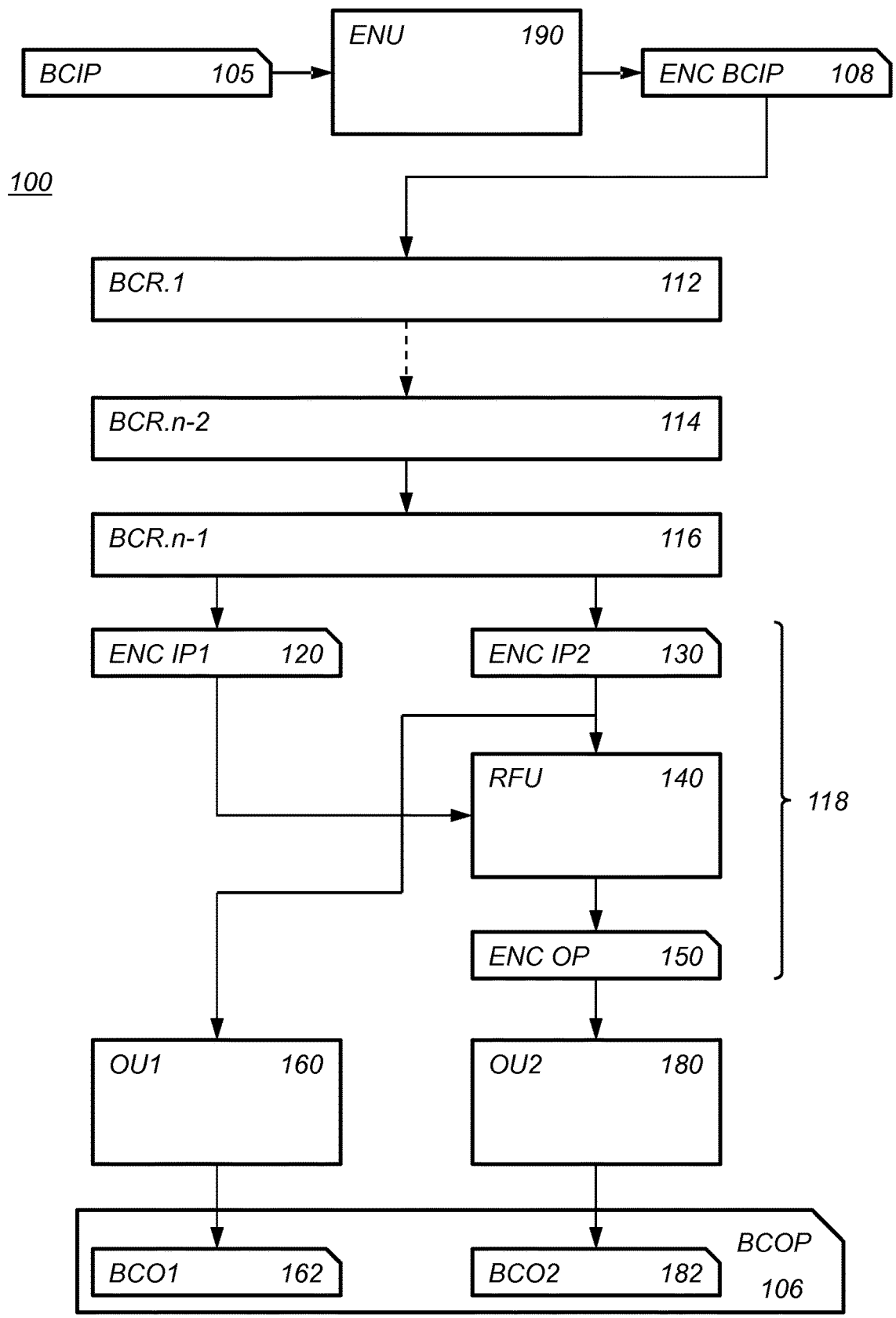

| Numeral | Acronym | Formula | Summary |
|---|---|---|---|
| 100 | | | a cryptographic device |
| 105 | BCIP | | a block cipher input |
| 106 | BCOP | | a block cipher output |
| 108 | ENC BCIP | | an encoding of the block cipher input |
| 112, 114, 116 | BCR.1, BRC.n-2, BRC.n-1 | | a block cipher round |
| 118 | | | a final block cipher round |
| 120 | ENC IP1 | $\lambda_{L,15}$ | a first encoded input |
| 122 | DTIP1 | $\omega_{L,15}$ | a first data-input |
| 124 | STIP1 | $\sigma_{L,15}$ | a first state-input |
| 130 | ENC IP2 | $\rho_{R,15}$ | a second encoded input |
| 132 | DTIP2 | $\omega_{R,15}$ | encoding second data-input |
| 134 | STIP2 | $\sigma_{R,15}$ | a second state-input |
| 140 | RFU | | a round function unit |
| 150 | ENC OPE$_{R,16}$($\omega_{R,16}$, $\sigma_{R,16}$) | | an encoded output |
| 152 | DTOP | | a data-value of encoded output 150 |
| 154 | STOP | | a state-value of encoded output 150 |
| 160 | OU1 | $O_L$ | a first output unit |
| 162 | BCO1 | | a first part of block cipher output 106 |
| 180 | OU2 | $O_R$ | a second output unit |
| 182 | BCO2 | | a second part of block cipher output 106 |
| 190 | ENU | | an encoder unit |
| 210 | ENC V | | an encoded value |
| 210.1, ..., 210.8 | ENC.1 V, ..., ENC.8 V | | an encoded sub-value |
| 211 | | | encoded values |
| 212 | DT | $\omega$ | a data value |
| 212.1, ..., 212.8 | DT.1, ..., DT.8 | $\omega_i$ | a data sub-value |
| 214.1, ..., 214.8 | ST.1, ..., ST.8 | $\sigma_i$ | a state sub-value |
| 213 | | | data values |
| 214 | ST | $\sigma$ | a state value |
| 215 | | | state values |
| 220 | TRSF | $\phi(\sigma, \tau)$ | a tamper-resistance shift function |
| 220.1 | TRSF.1 | $\phi(\sigma, \tau)_i$ | a tamper-resistance shift sub-function |
| 222 | | $\tau$ | an expected state-value |
| 222.1 | | $\tau$ | an expected state sub-value |
| 224 | SFTV | | a shift value |
| 224.1 | SFTV.1 | | a shift value |
| 225 | | | a connect |
| 230 | ADD | | an adder |
| 230.1 | ADD.1 | | an adder |
| 240 | SFT ENC V | | a shifted encoded value |
| 240.1 | SFT ENC.1 V | | a shifted encoded sub-value |
| 242 | DT | | a data value of shifted encoded value 240 |
| 242.1 | DT.1 | | a data sub-value |
| 244 | ST | | a state value of shifted encoded value 240 |
| 244.1 | ST.1 | | a state sub-value |
| 300 | RFU | | a round function unit |
| 320 | ITRSF | $\phi(\sigma_{R,15}, \tau_{R,15})$ | an internal tamper-resistance shift function |
| 322 | | | an expected state value |
| 324 | SFTV | | a shift value |
| 330 | ADD | | an adder |
| 342 | DTFUN | $f$ | a data round function unit |
| 344 | STFUN | $g$ | a state round function unit |
| 420 | TRSF1 | $\phi_{L,16}(\sigma_{L,16}, \tau_{L,16})$ | a first output tamper-resistance shift function |
| 422 | | | an expected state value |
| 424 | SFTV | | a shift value |
| 430 | ADD | | an adder |
| 440 | | | an output decoding |
| 500 | | | a block cipher |
| 520 | TRSF2 | $\phi_{R,16}(\sigma_{R,16}, \tau_{R,16})$ | a second output tamper-resistance shift function |
| 522 | | | an expected state value |
| 524 | SFTV | | a shift value |
| 530 | ADD | | an adder |
| 540 | | | an output decoding |

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

FIG. 1 schematically shows an example of an embodiment of a cryptographic device 100. Possible embodiments of details of cryptographic device 100 are illustrated with reference to FIGS. 2-5.

Cryptographic device 100 is configured to calculate a block cipher on a block cipher input 105 and to produce a block cipher output 106. The block cipher has multiple rounds that successively operate on an input to produce an output. As is further explained below, block ciphers for which the final round is based on a round function, as is used, e.g., in Feistel type ciphers are vulnerable to a particular type of differential fault attack. By operating the cipher twice on the same input, but manipulating a value in the final round—a so-called fault—an attacker can obtain information on the secret cryptographic key by comparing the output with and without the fault. Traditionally, differential fault attacks are performed by manipulating the hardware on which the cipher is executed to physically cause the fault; for example, voltage spikes may be introduced to cause the hardware to introduce a fault in the computation. The inventor has realized that differential fault attacks can also be executed in the white box attack models. In a white-box attack model, an attacker is assumed to have the power to manipulate variable of the block cipher while the cipher is being executed. For many applications, the white box attack model more closely resembles the realities of protecting computer data and software.

One class of block ciphers that is vulnerable to the differential fault attack are so-called Feistel ciphers. Well known examples of Feistel ciphers are the data encryption standard (DES) and Triple DES (TDEA), see, e.g., FIPS 46-3. There are many other Feistel type block ciphers beside DES. The inventors further realized that block ciphers which use a round function for the final block cipher round may also be vulnerable to the differential fault attack, even if other rounds of the block cipher do not use a Feistel structure.

FIG. 6.1, which is copied from FIPS 46-3 (incorporated herein by reference) illustrates the DES block cipher in particular and Feistel block ciphers in general. The block cipher receives a block cipher input 105' on which a sequence of block cipher rounds acts; in the case of DES there are 16 rounds, for triple DES 48. The first block cipher round acts on the block cipher input 105', each one of the next rounds acts on the output of the previous rounds. In a block cipher round a round function $f$ is applied to part of the previous round's output. The block cipher input has a data size, in case of DES of 64 bits. Each block cipher round modifies its block cipher round input to produce a block cipher round output. All block cipher round input and output have the same data size. Note that DES has an initial permutation and inverse initial permutation at the start and end of the block cipher. These have no cryptographic significance, since they do not depend on a key, and may be ignored for the purpose of the invention, they may be regarded as part of the first and last round respectively, or they may alternatively be regarded as separate parts of the block cipher operating before and after the proper block cipher rounds.

The Data Encryption Standard describes a keyed block encoding of a 64-bit block. The key is officially 64 bits, but only 56 bits thereof are actually used in the encryption. Encryption and decryption uses 16 iterations, called rounds. In round r, $1 \leq r \leq 16$ a 48-bit round key $K_r$ is used, the bits of which are a (round-dependent) subset of the 56 key bits.

The DES round function $f$ is given by: $f(R,K)=P(S(K \oplus E(R)))$. Here P is a permutation of 32 bits, and E an expansion map, which maps bit strings of length 32 into bit strings of length 48 by duplicating half the bits. S-box S maps bit strings of length 48 into bit strings of length 32, acting group-wise on 6-bit substrings:

$$S(b_1 b_2 b_3 \ldots b_{48}) = S_1(b_1 \ldots b_6) \| S_2(b_7 \ldots b_{12}) \| \ldots \| S_8(b_{43} \ldots b_{48}),$$

where each S-box $S_i$ maps bit strings of length 6 onto bit strings of length 4 and $\|$ denotes concatenation. Decryption is performed by going backwards, i.e., from bottom to top. The inverse round function is given by $$R_{r-1} = L_r, L_{r-1} = R_r \oplus f(L_r, K_r).$$

As DES uses a key of only 56 bits, so that a full key space search is feasible; however, key recovery using a differential fault attack especially on a software implementation will be orders of magnitude faster. Triple-DES uses three 56-bit keys ($K^{(1)}$, $K^{(2)}$, $K^{(3)}$) and encrypts by first performing a DES encryption with key $K^{(1)}$, followed by a DES decryption with key $K^{(2)}$, followed by a DES encryption with key $K^{(3)}$.

DES will be used herein as the principal example. Indeed embodiments based on DES have been tested extensively and it was found that the differential fault attack, also in the white-box context was severely mitigated. Results on DES immediately transfer to triple DES, as the final round of triple DES is the same as the final round of triple-DES. In general, the system explained below also applies to block cipher that apply a round function in the final round, e.g., block ciphers in which at least the final round has a Feistel structure.

Returning to FIG. 1. Cryptographic device 100 may comprise a processor configured to apply multiple rounds of cryptographic processing implementing the block cipher. Four of the multiple rounds are shown in FIG. 1. Three rounds are shown as block cipher rounds 112, 114 and 116; they represent the first (round 1), the third to last (round n−2), and the second to last (round n−1) (penultimate) block cipher round. The final block cipher round 118 (round n) is shown in more detail as the features relevant to the embodiment are illustrated here. Block cipher rounds corresponding to a traditional implementation of DES are illustrated in FIG. 6.1 as rounds 112' and 118'. In case of DES, there are n=16 rounds.

The processor of device 100 is not separately shown in FIG. 1. There are multiple options to implement the block cipher rounds. In an embodiment, cryptographic device is implemented solely in hardware. Differential fault attacks were originally devices as physical attacks on hardware implementations of DES. Implementing cryptographic device 100 in hardware also provides a hardware implementations of DES protected against differential fault attacks.

For example, cryptographic device 100 may comprise multiple block cipher rounds units, e.g., a block cipher round unit for each round of the block cipher; a block cipher round unit being configured to apply cryptographic processing to the output of a previous block cipher unit or the block cipher input. For example, the block cipher rounds unit, as well as the other units of cryptographic device 100, may be implemented in CMOS, e.g., using a hardware description language such as Verilog, VHDL etc. Hardware implementations are particularly secure. Alternatively the cryptographic device may be implemented in software. The latter option is more flexible, e.g., software may be downloaded which is not possible with hardware. However, software is more vulnerable to attack, especially in the white-box model.

The block cipher calculation operates on encoded values. An encoded value (210) is a cryptographic and reversible encoding of a data value ω, 212 together with a state value σ, 214. Encoding is illustrated in FIG. 2.1. A reversible encoding is applied to a pair of a data value and a state value. The data values are used to compute the correct encryption or decryption of the block cipher input. The state values are used to protect the data values from reverse engineering, and to protect the data values from tampering, e.g., as is done in a fault attack. The block cipher output 106 depends on the date values in encoded block cipher input 105, and does not depend on the state values in encoded block cipher input 105. In particular, block cipher output 106 only depends on the date values in encoded block cipher input 105 and on the cryptographic key that is used in the block cipher, in the sense that there exists a block cipher algorithm taking as input only data values of encoded input 108 and the key, and produce the same block cipher output 106.

Note that the key may be incorporated in cryptographic device 100, e.g., by partial evaluation or received, e.g., as an encoded key. An encoded key will only work with a cryptographic device 100 that uses the same encodings.

FIG. 2.1 shows an encoded value 210 which comprises a data value 212 and a state value 214. Symbolically, the data and state value 212 and 214 are illustrated as boxes, however, due to the cryptographic encoding the two values are not separately recognizable in operation. Typically, the bit length of encoded value 210 is the sum of the bit lengths of the data and state value. As the encoding is reversible, both the data and state value may be recovered from an encoded value; provided of course the used encoding is known. The encoding used will typically be known when cryptographic device 100 is made but will not be known to an attacker.

Both data and state values have a range of values. Typically, for both the data and state values all of the possible bit sequences given the data bit length or state bit length are included in the respective ranges. For example, a given data value may be, say 4 bit, and the state value may also be 4 bit. The encoded value will be 8 bit. Both the data and state value ranges are the 16 possible 4 bit sequences. FIG. 2.2 illustrates an encoding that may be used in cryptographic device 100. Under reference numeral 213 and 215 all combinations of a data value from a data range and a state value from a state range are listed; in this case both data and state values are 4 bit sequences. In this case, 16 times 16 is 256 combinations of a data and state values are listed. The data values are listed under 213. The state values are listed under 215. A random permutation of the 256 possible 8 bit sequences is selected and listed under reference 211. The random permutation is an encoding as any pair of a state and data value is mapped to a corresponding bit sequence in column 211.

This encoding is reversible as each possible combination of data and state value receives a different 8 bit sequence. In an embodiment, the bit length of state values is at least the bit length of the data values; longer state values can obfuscate more of how the data value is used. For example, a data value may be 4 bit and the state value may be 4 bit. For example, the data value may be 4 bit and the state value may be 6 bit. In an example, the state value is a multiple of the data value; it turns out that a higher level of protection is obtained whenever the bit length of the state value reaches the next multiple of the bit length of the data value.

A cryptographic encoding does not give the attacker information regarding the encoded values; at least not without undue computation effort. For example, cryptographic encoding may generated by selecting a random permutation of all possible combinations of data and state values; the randomness may be true or pseudo randomness. Alternatively, a data and state value may be encrypted using a secret key; e.g., using a block cipher for which the block length equals the sum of the bit lengths of the data and state value. A keyed encryption is also a random permutation, and has the advantage of being easier to implement the cryptographic device 100.

In case of DES a natural choice for bit length of the data value is 32 bit, which may be combined with a 32 bit state value. This choice will be assumed herein, however, it is stressed that different lengths are possible. Two of such 64-bit encoded value can represent the inputs of a round of DES, excluding the key. In white-box implementations the key may be incorporated in the round function by partially evaluating the round function for the key. This removes the round key as an input of a round.

For practical reasons longer data and state values, e.g., 32 bit data and state values, may be represented as a sequence of encoded sub-values. FIG. 2.7 illustrates this type of encoding of the data and state value. FIG. 2.7 shows 8 encoded sub values 210.1, 210.2, . . . , 210.7 and 210.8. An encoded sub-value is a cryptographic and reversible encoding of a data sub-value $\omega_i$, 212.1, . . . , 212.7, and 212.8 together with a corresponding state sub-value $\sigma_i$, 214.1, . . . , 214.7, and 214.8 into a single encoded sub-value. The data and state values are encoded in a single, monolithic, value which cannot be separated without decoding the value. For example, in FIG. 2.7 the data and state values may be 4 bits each, the sequence encoding a 32 bit data word and 32 bit state word. The encodings used for encoded sub values 210.1-201.8 may be different. For example, one of the encodings may use data and sub values of 4 bit and use the example encoding illustrated in FIG. 2.2, say.

Cryptographic device 100 is arranged to operating on encoded values to perform the block cipher calculations. In particular, Cryptographic device 100 is arranged to apply the multiple rounds of cryptographic processing on an encoding of the block cipher input 108. The encoded block cipher input 108 may be received by device 100 in encoded form. This has the advantage that the plain version of the data is not available on the device. This may for example be used if device 100 is configured for decryption. Also if device 100 is configured for encryption an encoded input may be received. For example, the latter may be used if the encryption is performed on an untrusted computer. For example, in an embodiment, on a first device an input is encoded and sent to cryptographic device 100, cryptographic device 100 can then encrypt the encoded input. This has the advantage that the key used by the block cipher need not be available on the first device and the cryptographic device 100 does not need access to the plain input. Encoding may be done by an encoder unit 190.

Encoder unit 190 may be configured to receive block cipher input 105 in un-encoded form, e.g. plain form. Encoder unit 190 may apply an encoding to obtain an encoding of the block cipher input 108. In an embodiment encoder unit 190 comprises a state value selection unit arranged to select one or more state values. For example, the state values may be a function of block cipher input 105, e.g., using a hash function; For example, the state values may be randomly selected. Encoder unit 190 may comprise a processor arranged to apply an encoding to a data value obtained from block cipher input 105 together with a selected state value. For example, the encoder 190 may encode according to an encoding according to FIG. 2.7. In case of DES, the encoder 190 may encode a 64 bit block cipher input 105, e.g., on block cipher block as two encoded values of each 64 bits; each 64 bit encoded value comprising a 32 bit data value representing block cipher input 105 and a 32 bit state value.

Encoder unit 190 is fully optional, as cryptographic device 100 may obtain the block cipher input directly in the form of encoded block cipher input 108.

Encoded block cipher input 108 is the input for the first block cipher round 112. The output of first block cipher round 112 is the input to a second block cipher round (not separately shown). For example, a first block cipher round unit receiving as input the encoded block cipher input, possible after permutation, each following block cipher round unit receiving as input the output of a previous block cipher round unit. Block cipher rounds may receive encoded round keys, but may also have round keys incorporated in the round key by partial evaluation. The latter option is preferred for obfuscation of the key. White-box table based implementations of cryptographic device 100 are particularly suitable for having round keys incorporated in the tables representing the round function.

Final round 118 of the multiple rounds receives as input a first encoded input $\lambda_{L,15}$, 120, and a second encoded input 130.

First encoded input 120 encodes a first data-input $\omega_{L,15}$, 122 and a first state-input $\sigma_{L,15}$, 124. First encoded input 120 is illustrated in FIG. 2.3. For example, $\lambda_{L,15} = E_{L,15}(\omega_{L,15}, \sigma_{L,15})$, wherein $E_{L,15}$ represents an encoding. Second encoded input $\rho_{R,15}$, 130 encodes a second data-input $\omega_{R,15}$, 132, and a second state-input $\sigma_{R,15}$, 134. Second encoded input 130 is illustrated in FIG. 2.4. For example, $\rho_{R,15} = E_{R,15}(\omega_{R,15}, \sigma_{R,15})$, wherein $E_{R,15}$ represents an encoding. In an embodiment, first data-input 122 represents the value $L_{15}$ and second data-input 132 represents the value $R_{15}$. In general, an embodiment of cryptographic device 100 implementing DES may follow the architecture of FIG. 6.1, in the sense that data values of FIG. 6.1 are represented as data values in encoded values of cryptographic device. Although such a correspondence is possible and provides easier debugging, this is not necessary. For example, consecutive operations in FIG. 6.1 may be wholly or partially conflated in cryptographic device 100, e.g., using partial evaluation. First and second encoded input 120 130 may be obtained as outputs of the second to last block cipher round 116.

Round function unit 140 is arranged to receive the second encoded input 130 that encodes the data value 132, $\omega_{R,15}$ and state value 134, $\sigma_{R,15}$ and to produce an encoded output 150. Round function unit 140 first applies an internal tamper-resistance shift function to data-value 132 followed by a cryptographic round function that acts on the data-input 132 after application of the internal tamper-resistance shift function, and possibly also on the state-input 134. FIG. 2.5 illustrates encoded output 150 encoding data value 152 and state value 154.

So called tamper resistance functions increase the resilience of a cryptographic device using state against unauthorized modification of values. Faults, such as used in a differential fault attack, are examples of such an unauthorized modification. However, the inventor has found that careful placement of the tamper resistance functions significantly improves resistance against differential fault attacks. In cryptographic device 100 tamper resistance functions are applied at (at least) three positions: At the input to round function 140, said internal tamper resistance function; and at the input of the first and second output unit, first and second output tamper-resistance shift function.

A tamper-resistance shift function modifies a data-value in an encoded value in case the state-value in the encoded value does not equal an expected state-value and does not modify the data-value otherwise. An example of the operation of a tamper-resistance shift function is further explained with reference to FIG. 2.6. FIG. 2.6 shows encoded value 210, which encodes data value 212 and state value 214. A tamper-resistance shift function 220 receives the state value 214 as input and produces a shift value 224. The tamper-resistance shift function 220 may be arranged so that the shift value 224 has a specific value, e.g., zero, if the state-value in the encoded value equals the expected state-value and a different value than the specific value, e.g., non-zero, if the state-value in the encoded value does not equal the expected state-value. This may be accomplished by setting shift value 224 to the difference between the expected the difference between the state-value ($\sigma$) in the encoded value and the expected state-value ($\tau$), e.g., $\phi(\sigma, \tau) =$ $\sigma - \tau$; the difference being calculated in the range of state values, e.g., modulo a power of 2. Other examples of shift functions may be generated by applying a random bijection h to the difference, e.g., $h(\sigma - \tau)$.

The expected state value may be incorporated in function 220 if the expected state value is independent of the input data value of the block cipher. For example, this may be accomplished by selecting predetermined state values in the encoding of the block cipher input. The block cipher rounds may be arranged so that the predetermined state values follow a predetermined path, so that the state values that will arrive in function 220 are known. On the other hand, the expected state value 222 may be an input to function 220. The expected state value may be encoded together with a data value. For example, the operations on state values in the block cipher may be arranged so that part of the operations is the inverse of another part of the operations. In this way, the expected state value may be equal, or have a fixed relationship with, the state values in the encoded block cipher input.

The shift value 224 may be applied to the data value by adding the shift value to the data value in an adder 230. The addition is chosen so that the specific value does not change the data value, e.g., regular addition may be used if the specific value is zero. The addition may be an arithmetic addition modulo the size of the range of data values. The addition may be an XOR operation. In general the 'addition' may be any function add such that addition of the data value and the specific value equals the data value and the addition of the data value and a different value than the specific value differs from the data value. Adder 230 receives as input the data value 212 and shift value 224 and produces as output data value 242 of shifted encoded value 240. The state value 244 of shifted encoded value 240 may be the same as state value 214. However, in the path 225 from state value 214 to state value 244 there may be a further state function. Such a function has the advantage that later tamper resistance functions must assume that state value has been changed following the further state function. Should the tamper resistance function have been removed or otherwise been tampered with this will be detected in the later tamper resistance function. Resistance against removal of functions is however regarded as a less important threat than differential fault analysis, since this attack is much more advanced, so a further state function on path 225 is optional.

In FIG. 2.6, and more generally in other figures relating to cryptographic device 100, the operations 220, and 230 have been shown as separate boxes. However, in an embodiment the function 220 and 230 will likely be integrated in a single operation, e.g., a single table network. This integrated function receives as input encoded state value 210 and possibly expected state value 222 and produces as output the shifted encoded value 240. When the integrated function uses tables for the operations, the computation can be done entirely in the encoded domain.

Tamper resistance functions may also be applied to encoded values that are represented as a sequence of encoded sub-values, e.g., as illustrated in FIG. 2.7. Also a tamper-resistance shift function may comprise a sequence of tamper-resistance shift sub-functions $\phi(\sigma, \tau)_i$ for modifying the respective data sub-value ($\omega_i$) in an encoded value. An example embodiment of a tamper resistance function adapted to be applied to an encoded value represented as a sequence of encoded sub-values is given in FIG. 2.8.

FIG. 2.8 shows one of the multiple encoded sub-values: encoded sub-value 210.1 encoding data sub-value 212.1 and state sub-value 214.1; and one of the multiple tamper resistance sub functions, tamper resistance sub-function 220.1 As in FIG. 2.6, tamper-resistance shift sub-functions 220.1 produces a shift value 224.1 which has the specific value, e.g. zero, if the state value 214.1 equals an expected state sub-value 222.1. An adder 230.1 adds the shift value to the data sub-value 212.1 to produce shifted data sub-value 242.1. State sub-value may be equal to state value 214.1 or equal to state value 214.1 after application of a further state sub-function in path 225.

FIGS. 2.6 and 2.8 show the result of applying the tamper resistance shift functions as an encoded value. In this way the shifted encoded value 240 or sequence 240.1, . . . , may be used as input for further processing. Although this is possible, this is not necessary. The result of the applying may also be used in further computations before an encoded value as shown in FIGS. 2.6 and 2.8 is produced.

For example, in a table based implementation of FIG. 2.6 using sequences of encoded sub-values as in FIGS. 2.7 and 2.8, function 220.1 and adder 230.1 and optional further state function 225 may be combined in a sequence of tables; each table receiving as input an encoded sub-value 210.1, . . . , and producing as output a shifted encoded output 240.1, . . . .

First output unit 160, $O_L$ is arranged to receive second encoded input 130 and to apply a first output tamper-resistance shift function to the second encoded input followed by decoding the data-value 132 to obtain a first part 162 of the block cipher output 106.

Second output unit 180, $O_R$, is arranged to receive encoded output 150 and to apply a second output tamper-resistance shift function to the encoded output followed by decoding the data-value 152 to obtain a second part 182 of the block cipher output 106.

In an embodiment, the second output tamper-resistance shift function comprises a sequence of tamper-resistance shift sub-functions for modifying the respective data sub-value in encoded value 150. Each tamper-resistance shift sub-function of the second output tamper-resistance shift function takes on all data values when a state sub-value of the second encoded input 130 runs over all state values. It was found that this feature provides a large contribution to the protection against fault attacks.

An attacker who modifies an encoded sub-value in encoded input value 130 will find differing outputs in second part 182 of the block cipher output. If, by chance, an attacker happens to modify an encoded sub-value in encoded input value 130 so that only the data value is changed and not the state value, the tamper resistance shift function will not detect such a change. Note that an attacker cannot directly enforce this, since the data value and state value are encoded together, however, an attacker may achieve this by chance. For example, in FIG. 2.2, if the attacker changes 11010110 to 01001111, then (in this particular case) only a data value is changed not a state value. Such a fortuitous change may leak information on the key, along the lines of a traditional fault attack. However, if a tamper-resistance shift sub-function of the second output tamper-resistance shift function takes on all data values when a state sub-value of the second encoded input 130 runs over all state values, it becomes much harder for an attacker to recognize that he has hit upon a modification that only touches the data value and not the state value.

For example, data sub-values may be d bits wide, state sub-value s bits wide and encoded sub-values d+s bits wide. As an encoded sub-values in encoded input 130 runs through all $2^s$ encoded values, for a particular data sub-value and all possible state sub-values, a data value (e.g. the output of adder 230.1) of a second output tamper-resistance shift function runs through all $2^d$ possible data values. In an embodiment s≥d. If d=s each data value occurs once for each state value. If s>d some data sub-values will occur more often as the state value runs through its range; In an embodiment, each data sub-value occurs exactly $2^{s-d}$ times in each tamper-resistance shift sub-function of the second output tamper-resistance shift function when a state sub-value of the second encoded input.

The encoding that is used in the block cipher to protect the content of an encoded value from analysis is removed in the first and second output units.

In a differential fault attack, an attacker executed the block cipher twice on the same input data, but modifies the second encoded input value 130 in one of the runs. Comparing the outputs of the two executions provides information on the processing done in round function unit 140. The processing done in round function unit 140 is secret as it defines (part of) the encryption or decryption of the block cipher and thus provides information on the round key. The strategic placement of the three tamper resistance functions decreases the possibilities for the attacker to manipulate encoded input value 130.

In an embodiment, the cryptographic device comprises a storage coupled to an electronic processor, the storage storing a number table networks (110, $T_1$, $T_2$) implementing at least the round function unit and the first and second output unit. The processor being arranged to execute table-look up implementation in said stored tables.

Figure 3:
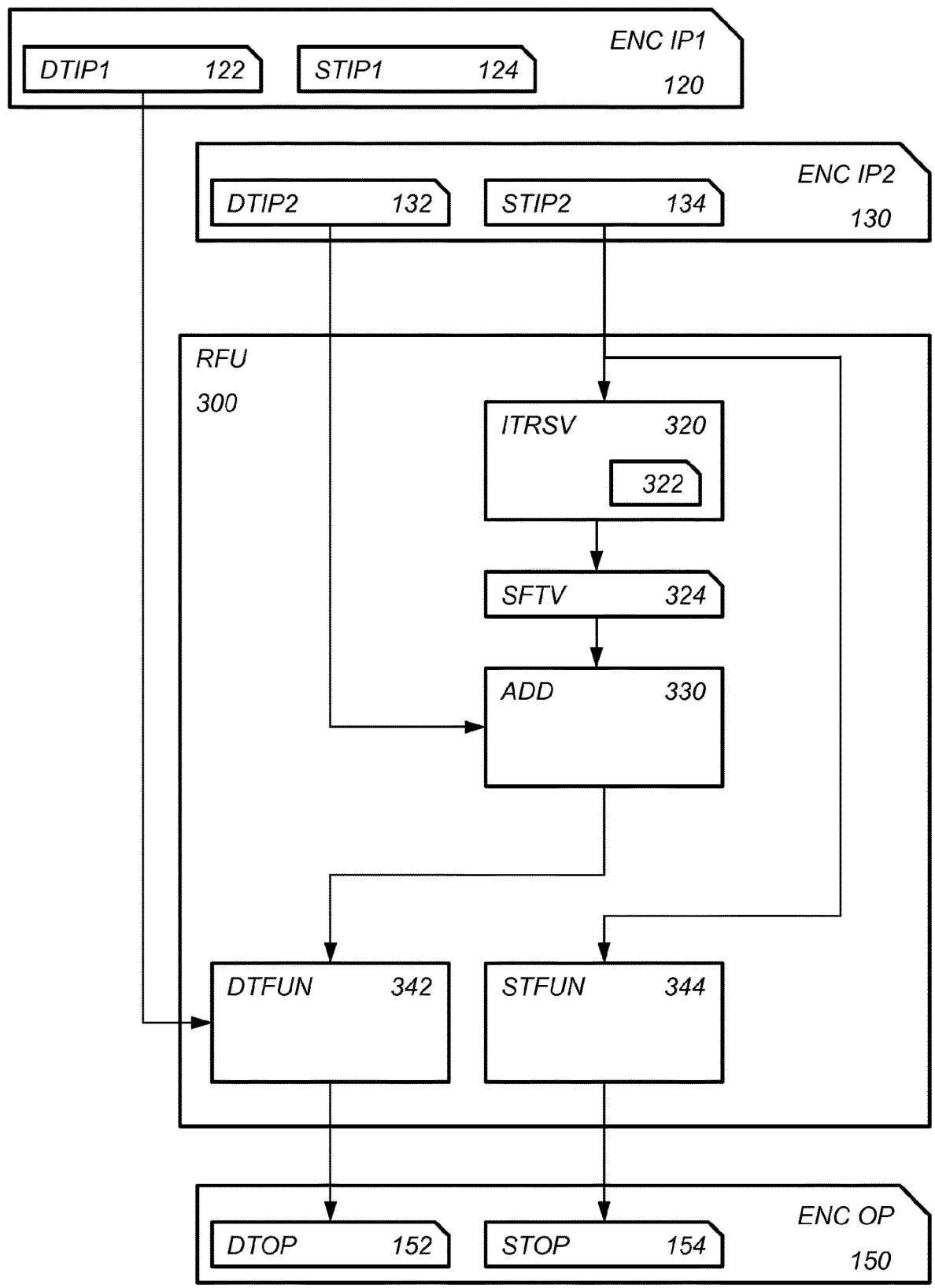

FIG. 3 schematically shows an example of an embodiment of a round function unit 300. Round function unit 300 may be used to implement round function unit 140. Shown in FIG. 3 is encoded input value 130 that encodes data value 132 and state value 134, and encoded input value 120 that encodes data value 122 and state value 124.

Round function 300 comprises an internal tamper-resistance shift function 320, a data round function unit 342, and a state round function unit 344.

Internal tamper-resistance shift function 320 receives state value 134 and produces a shift value 322 relative to an expected state value 322, e.g., as explained with reference to FIGS. 2.6 and 2.8. Round function 300 comprises an adder 330 to add the shift value to data value 132. For example, internal tamper-resistance shift function 320 and adder 330 may be implemented as a sequence of internal tamper-resistance shift sub-functions.

Data round function unit 342 applies the data round function on the shifted data value produced by adder 230 and adds the data value 122. This follows the Feistel structure. For example, if cryptographic device 100 is configured for DES, the data round function in unit 342 may implement an expansion function E, a series of S-boxes ($S_1$, . . . , $S_8$) and a permutation as illustrated in FIG. 6.2. Note that a data sub-value of the result of the data round function will typically depend on more than one, or even all, data sub-values of the input of the data round function. This makes implementation of the round function as a table network more complicated, than say implementation of internal tamper resistance shift function 320. However, implementation of a block cipher, e.g., DES, as a table network is known in itself, see e.g. Chow. Different from Chow the round function acts on encoded variable that include both a data and state value. In FIG. 3, the data function unit 342 and state function unit 344 are depicted as separate boxes, however these operation can be executed together in the same table network to avoid having data or state value encoded separate from each other.

Round function 300 may optionally further comprises a state round function unit 344. The state round function unit 344 applies the state round function on the state value 134. This makes it harder to tamper with cryptographic device 100 by omitting one more operations, as a later tamper resistance shift function expects the state function to be modified by the state round function. In FIG. 3, the state round function depends only on state value 134.

In an embodiment, state round function unit 344 applies the state round function to state value 134 and adds state value 124. Imposing a Feistel structure on the state value computations is not strictly necessary, but provides a great convenience when cryptographic device 100 is implemented as a white-box table network. Since the state value computations also follow a Feistel structure, the same table structure may be used for the state values. In an embodiment, the block cipher has a Feistel structure and the calculation of the state values also has a Feistel structure.

In an embodiment, the state round function in state round function unit 344 is chosen so that the diffusion of the round function unit (140) of the data value (132, 152) of the encoded input (130) and output (150) of the round function unit is the same as the diffusion of the round function unit on state values (134, 154) of the encoded input (130) and output (150) of the round function unit.

Having the same diffusion may be defined on bit level so that for each data bit j in data value 152 that is not affected, e.g., does not depend on, a data bit i in data value 132 it is the case that state value bit j in state value 154 is also not affected by state value bit i in state value 134. A broader definition is also sufficient however, so that for each data sub-value j in data value 152 that is not affected, e.g., does not depend on, a data sub-value i in data value 132 it is the case that state value sub-value j in state value 154 is also not affected by state value sub-value i in state value 134. These criteria avoid that an attacker may find out if a state value has been modified by finding that plain output data values are modified that are not compatible with the structure of the data round function.

For example, this may be achieved by using the same or similar data round function as the state round function. For example, the state round functions in the final half of the block cipher rounds could be the same as the data round functions in the final half of the block cipher rounds, whereas in the first half of the block cipher round, the state functions are equal to the inverse of the data rounds of the final half of the block cipher rounds. In this way the diffusion in the final round of the state value is exactly the same as the diffusion of the data value, yet at the same time predictable state values occurs in the final round.

For example, in case of DES the state round function of the final round could comprise S-boxes, permutation, and expansion matrices.

An alternative to achieve the same diffusion is to select a state round function (g) as $g(\sigma) = \pi_1(N_1(\sigma)) \| \pi_2(N_2(\sigma)) \| \ldots \| \pi_8(N_8(\sigma))$, wherein the $\pi_i$ are bijections on state values, and $$N_i(\sigma) = \bigoplus_{j=1}^{8} \varepsilon_{i,j} \sigma_j,$$

wherein $\varepsilon_{i,j}=1$ if the j-th data value in $\omega_{R,15}$ affects the input of an i-th S-box, and 0 otherwise. This construction forces equal diffusion without duplicating the data round function. A secret value $K_\sigma$—the state key—may be incorporated in the construction as follows:

$$g(\sigma, K_\sigma) = \pi_1((K_\sigma)_1 \oplus N_1(\sigma)) \| \pi_2((K_\sigma)_2 \oplus N_2(\sigma)) \| \ldots \| \pi_8((K_\sigma)_8 \oplus N_8(\sigma))$$

The state key $K_\sigma$ may be received in state round function 344 as an encoded key. This allows a white box implementation to be customized for different applications.

In an embodiment, cryptographic device is configured to receive the state key encoded together with the data key. The data key may be a DES round key, in particular the round key of the final round. For example, the round function unit may be configured to receive state key $K_\sigma$ encoded with a final round key of the block cipher, e.g. DES etc, Note that, so long as the state values are not illegally modified, the state values do not influence the computation of the data values. However, if a state value is changed this will impact the data values through the tamper resistance shift functions.

Figure 4:
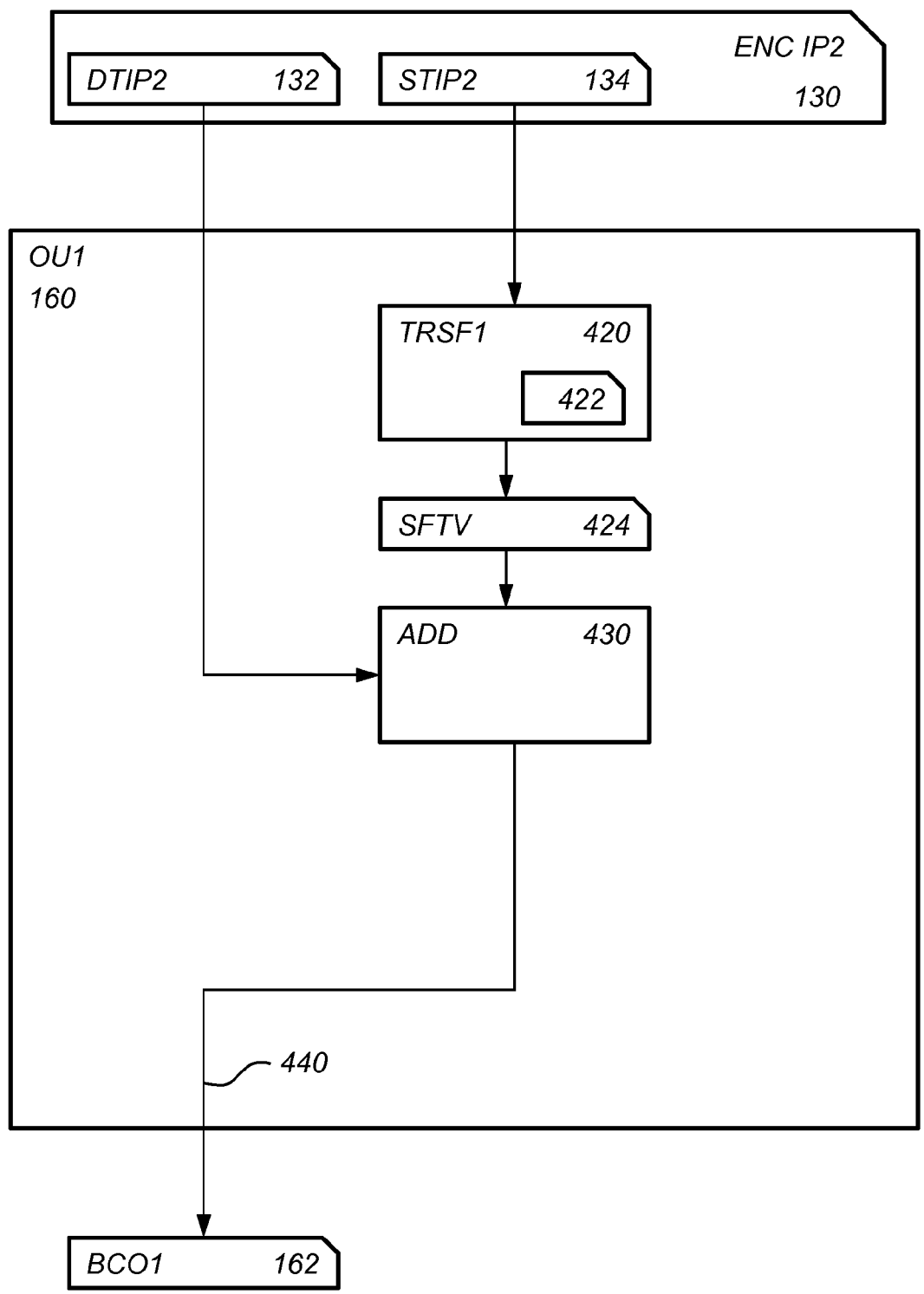

FIG. 4 schematically shows an example of an embodiment of a first output unit 160. First output unit 160 may be used as in an embodiment of cryptographic device 100.

FIG. 4 shows output unit 160 receiving encoded input 130 encoding data value 132 and state value 134. Output unit 160 comprises a first output tamper-resistance shift function 420 producing a shift value based on expected state value 422 and state value 134. The shift value 424 is added with an adder 430 to data value 132. Output unit 160 does not employ an output encoding 440, so that the output of unit 160 is a plain data value.

Figure 5:
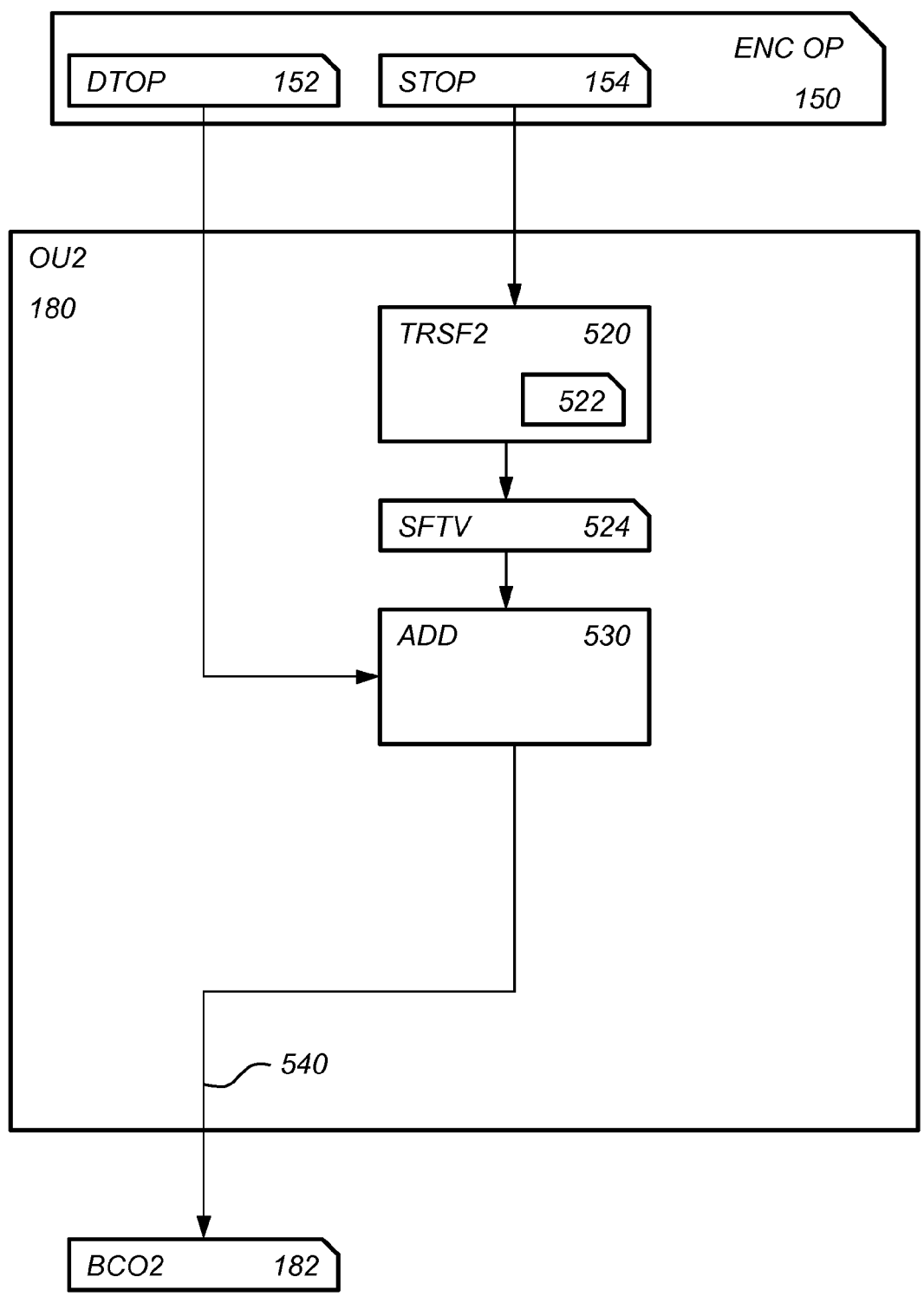

FIG. 5 schematically shows an example of an embodiment of a second output unit 180. Also second output unit 180 may be used in cryptographic device 100. Second output unit 180 works similar to output unit 160, receiving as input encoded output 150. Output unit 180 comprises a second output tamper-resistance shift function 520 producing a shift value 524 based on expected state value 522 and state value 154. The shift value 524 is added with an adder 530 to data value 152. Output unit 180 does not employ an output encoding 540, so that the output of unit 180 is a plain data value.

In a table based implementation, output units 160 and 180 may be implemented as a sequence of tables that take an encoded sub-value as input and produce a plain data value as output. In case of DES, this could be done with 8 tables each receiving an 8 bit input, and producing a 4 bit output.

Typically, cryptographic device 100 comprises a microprocessor (not shown in FIG. 1) which executes appropriate software stored at the device 100; for example, that software may have been downloaded and/or stored in a corresponding memory, e.g., a volatile memory such as RAM or a non-volatile memory such as flash (not shown in FIG. 1). Alternatively, cryptographic device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use.

In an embodiment, cryptographic device 100 comprises a block cipher rounds circuit for applying block cipher rounds, a round function circuit, a first output circuit, a second output circuit. The device 100 may comprise additional circuits, e.g., a communication circuit, etc. The circuits implement the corresponding units described herein. The circuits may be a processor circuit and storage circuit, the processor circuit executing instructions represented electronically in the storage circuits. The circuits may also be FPGA, ASIC or the like.

A further advantageous cryptographic device is a cryptographic device for calculating a block cipher (500) on a block cipher input (105) and producing a block cipher output (106), the block cipher calculation operating on encoded values (210), an encoded value (210) being an cryptographic and reversible encoding of a data value ($\omega$, 212) together with a state value ($\sigma$, 214), the cryptographic device comprising a processor (1120) configured to apply multiple rounds (112, 114, 116, 118) of cryptographic processing on an encoding of the block cipher input (108), implementing the block cipher, wherein an encoded value (210) comprises a sequence of encoded sub-values (210.1, 210.2, ..., 210.8), an encoded sub-value being a cryptographic and reversible encoding of a data sub-value ($\omega_i$, 212.1, 212.2, ..., 212.8) together with a corresponding state sub-value ($\sigma_i$, 214.1, 214.2, ..., 214.8) into a single encoded sub-value, the input to a final round (118) of the multiple rounds comprising a first encoded input ($\lambda_{L,15}=E_{L,15}(\omega_{L,15},\sigma_{L,15})$, 120), encoding first data-input ($\omega_{L,15}$, 122) and first state-input ($\sigma_{L,15}$, 124), and a second encoded input ($\rho_{R,15}=E_{R,15}(\omega_{R,15},\sigma_{R,15})$, 130), encoding second data-input ($\omega_{R,15}$, 132), and second state-input ($\sigma_{R,15}$, 134), the processor implementing a round function unit (140; 300) for applying the final round (118) of the multiple rounds of cryptographic processing implementing the block cipher and a second output unit (180) for decoding encoded output data (152), wherein the round function unit (140) being arranged to receive the second encoded input ($\omega_{R,15},\sigma_{R,15}$, 130), and to apply ($\omega_{R,15}\oplus\phi(\sigma_{R,15},\tau_{R,15})$) an internal tamper-resistance shift function ($\phi(\sigma_{R,15},\tau_{R,15})$, 320) to the data-value (132) of the second encoded input (130) followed by a cryptographic round function (f, g, 342, 344) acting on the data-input (132) and state-input (134) of said shifted second encoded input (130) to produce an encoded output ($\omega_{R,16}=\omega_{L,15}\oplus f(\omega_{R,15}\oplus\phi(\sigma_{R,15},\tau_{R,15}), K_{16}), \sigma_{R,16}$, 150), a tamper-resistance shift function ($\phi(\sigma,\tau)$, 220) modifying the data-value ($\omega$, 212) in an encoded value (210) in case the state-value ($\sigma$, 214) in the encoded value (210) does not equal an expected state-value ($\tau$, 222) and not modifying the data-value ($\omega$, 212) otherwise, a tamper-resistance shift function ($\phi(\sigma,\tau)$, 220) comprising a sequence of tamper-resistance shift sub-functions ($\phi(\sigma,\tau)_i$, 220.1) for modifying the respective data sub-value ($\omega_i$) in an encoded value.

the second output unit ($O_R$, 180) being arranged to receive the encoded output ($\omega_{R,16},\sigma_{R,16}$, 150), and to apply a second output tamper-resistance shift function ($\phi_{R,16}(\sigma_{R,16},\tau_{R,16})$, 520) to the encoded output ($\omega_{R,16},\sigma_{R,16}$, 150), followed by decoding the data-value (152) to obtain at least a second part (182) of the block cipher output (106), each tamper-resistance shift sub-function of the second output tamper-resistance shift function ($\phi_{R,16}(\sigma_{R,16},\tau_{R,16})_i$) takes on all data sub-values when a state sub-value of the second encoded input ($\rho_{R,15}$, 130) runs over all state values.

Below further example embodiments according to the invention are described.

The differential fault attack (DFA) is most easily described in the 'grey box' scenario. We assume that the attacker is able to modify $R_{15}$ in some way, e.g., by shooting a laser pulse at the right position on the chip at the right moment of time, and he is able to see the effect of that unknown change upon the output ($L_{16}$, $R_{16}$). Denoting the changed values by a tilde, we have that $$L_{16}=R_{15}, R_{16}=L_{15}\oplus f(R_{15},K_{16})$$

$$\tilde{L}_{16}=\tilde{R}_{15}, \tilde{R}_{16}=L_{15}\oplus f(\tilde{R}_{15},K_{16})$$

Taking the bitwise XOR of the rightmost equations, the unknown $L_{15}$ drops out and using the leftmost equations to express the not directly observable $R_{15}$ in terms of the observable output $L_{16}$, we find that $$R_{16}\oplus\tilde{R}_{16}=f(L_{16},K_{16})\oplus f(\tilde{L}_{16},K_{16})$$

It is now easy to find all 48-bit keys K that satisfy $$R_{16}\oplus\tilde{R}_{16}=f(L_{16},K)\oplus f(\tilde{L}_{16},K), \tag{1}$$

in fact this check can be done per 6-bit sub-key for each S-box $S_i$. Typically significantly fewer than 64 sub-keys satisfy this equation, and this set of solutions depends on ($L_{16}$, $R_{16}$, $\tilde{L}_{16}$, $\tilde{R}_{16}$). Typically, the real round-16 key $K_{16}$ is the only one that satisfies eq. (1) for all possible inputs and changes, and it can be found using typically only a small number of inputs and fault injections.

When $K_{16}$ is retrieved, 48 out of the 56 relevant key bits are known, and the remaining bits can be found by trying all 256 possible keys. If the attacker can modify the inputs to each of the last rounds of the encryptions and decryption of triple DES, he can find the complete key in a similar way.

In a white box scenario, the attacker can inspect and modify all variables. In particular, he can modify $R_{15}$ and try out all its values, and observe the effects on the outcome. Thus he is able to recover the key even faster than in the grey box scenario.

Embodiments protect against an attacker who tries all values of $R_{15}$. This will also protect against the DFA attack in the grey box scenario. Embodiments may use one or more of the following:

1. Auxiliary variables, called states, for some or all internal variables, called values. The numbers in memory are an encoding of both the value and the state.

2. State elimination: the output of the (triple-)DES algorithm should be the value of encrypted cipher text, without the state. This means that the implementation should offer a mapping from an encoded (value, state) pair for $L_{16}$ and $R_{16}$, respectively, to their values. Advantageously, this mapping is not simply the inverse of the encoding function, since this would allow an attacker to completely strip off all state variables in the complete program that use the same encoding. Instead, this mapping, denoted M, does the following:

$$M(E(\text{value,state}))=\text{value}\oplus\phi(\text{state,correctstate}).$$

Here E denotes the encoding function and $\phi$ is a mapping from two states to a value space which maps two equal inputs to the zero bit string in value space. That is, M returns the value when the state equals the correct state, and gives it an offset otherwise.

3. State evolution: the function M must 'know' the correct state. This implies that the state variables cannot be random, but they must evolve according to some rule, which can be chosen by the implementer and is unknown to the attacker.

4. State-dependent value evolution: the value evolves normally if the state is correct, but gets an offset if it is incorrect. In some embodiments this is only used in the 16-th round, but may be applied in more or all rounds.

These ingredients can be combined in such a way that a fault injection attack, based on eq. (1), does not work. This improves upon the state of the art: if the fourth ingredient is not used, an individual sub-keys can be found quickly.

Notation: values are denoted by $\omega$, i.e., $\omega_{L,r}=L_r$ and $\omega_{R,r}=R_r$, states are denoted by $\sigma$, and each variable in the program can be encoded in a different way. The encoded L and R variables, i.e., the numbers in memory, are denoted by λ and ρ, so we have $$\lambda_{L,15}=E_{L,15}(\omega_{L,15},\sigma_{L,15}), \rho_{R,15}=E_{R,15}(\omega_{R,15},\sigma_{R,15}),$$

etcetera. For the first 15 rounds, we let the values evolve according to the DES specification, i.e., $$\omega_{L,r}=\omega_{R,r-1}, \omega_{R,r}=\omega_{L,r-1}\oplus f(\omega_{R,r-1},K_r) \text{ for } 1\leq r\leq 15.$$

However, for the last round, the input to the Feistel is not $\omega_{R,15}$, but $\omega_{R,15}\oplus\phi(\sigma_{R,15},\tau_{R,15})$, where $\tau_{R,15}$ is the 'correct state' at this point. That means that in the last round we have $$\omega_{L,16}=\omega_{R,15}, \omega_{R,16}=\omega_{L,15}\oplus f(\omega_{R,15}\oplus\phi(\sigma_{R,15},\tau_{R,15}), K_{16}). \quad (2)$$

Since ω evolves according to a Feistel, it makes sense to let σ evolve according to a Feistel as well. In particular, in the last round we let it evolve as follows:

$$\sigma_{L,16}=\sigma_{R,15}, \sigma_{R,16}=\sigma_{L,15}\oplus g(\sigma_{R,15},K_{\sigma,16}),$$

In particular, also the correct state, τ, must evolve in this way:

$$\tau_{L,16}=\tau_{R,15}, \tau_{R,16}=\tau_{L,15}\oplus g(\tau_{R,15},K_{\sigma,16}),$$

for some function g. The advantageous properties of g are derived below.

With Feistel evolution, the state-evolution in the last 8 rounds can be chosen to be the inverse of that in the first 8 rounds, so that the final state is equal to the initial state, which in turn is a simple function of the DES input.

Now we turn to the mappings $M_{L,16}$ and $M_{R,16}$ that are used for eliminating the state. We have that the left and right outputs are given by $$O_{L,16}:=M_{L,16}(\lambda_{16})=M_{L,16}(E_{L,16}(\omega_{L,16},\sigma_{L,16}))=\omega_{L,16}\oplus\phi_{L,16}(\sigma_{L,16},\tau_{L,16}),$$

$$O_{R,16}:=M_{R,16}(\rho_{16})=M_{R,16}(E_{R,16}(\omega_{R,16},\sigma_{R,16}))=\omega_{R,16}\oplus\phi_{R,16}(\sigma_{R,16},\tau_{R,16}).$$

Computations are simplified by choosing the functions $\phi$ and $\phi_{L,16}$ to be the same. Then we have that $$O_{L,16}=\omega_{L,16}\oplus\phi(\sigma_{L,16},\tau_{L,16})$$

and from eq. (2) and the evolution of σ and τ it follows that $$O_{R,16}=\omega_{L,15}\oplus f(O_{L,16},K_{16})\oplus\phi_{R,16}(\sigma_{R,16},\tau_{R,16}).$$

Now we consider an attacker who modifies $\rho_{15}$. In the unmodified system, σ=τ everywhere, so $\phi_{R,16}(\sigma_{R,16},\tau_{R,16})=\phi_{R,16}(\tau_{R,16},\tau_{R,16})=0$, and $$O_{R,16}=\omega_{L,15}\oplus f(O_{L,16},K_{16}).$$

In the modified system, it may be that $\tilde{\sigma}_{R,15}\neq\sigma_{R,15}=\tau_{R,15}$, so that he will find $$\tilde{O}_{R,16}=\omega_{L,15}\oplus f(\tilde{O}_{L,16},K_{16})\oplus\phi_{R,16}(\tilde{\sigma}_{R,16},\tau_{R,16}).$$

XOR-ing both equations, we obtain $$O_{R,16}\oplus\tilde{O}_{R,16}=f(O_{L,16},K_{16})\oplus f(\tilde{O}_{L,16},K_{16})\oplus\phi_{R,16}(\tilde{\sigma}_{R,16},\tau_{R,16}).$$

Now compare this to the actual attack: the attacker tries to find solutions to eq. (1), which in terms of the output variables reads $$O_{R,16}\oplus\tilde{O}_{R,16}=f(O_{L,16},K)\Delta f(\tilde{O}_{L,16},K).$$

If the change is such that the offset $\phi_{R,16}(\tilde{\sigma}_{R,16},\tau_{R,16})=0$, then $K=K_{16}$ solves this equation, but if the offset is non-zero, then $K=K_{16}$ is not a solution. In fact, for any K we can find an offset such that K is a solution, namely $$\text{offset}=f(O_{L,16},K)\oplus f(\tilde{O}_{L,16},K)\oplus f(O_{L,16},K_{16})\oplus f(\tilde{O}_{L,16},K_{16}).$$

As each S-box outputs four bits (a.k.a. a nibble) the most natural choice for the encodings is to let each $L_r$ and $R_r$ be encoded per nibble, i.e. $\lambda_r$ and $\rho_r$ are a sequence of 8 encoded nibbles, and each encoded nibble is an independent encoding of the nibble value and nibble state. The nibble value is four bits, we choose the nibble state to be k times as large, i.e., 4 k bits. Thus an encoded nibble is a (4+4 k)-bit string.

In an embodiment, we choose k=1. We shall remark on the limitations of this choice and the implications for a DFA attack below.

We now describe an attack, in which the attacker tries to determine the 6-bit sub-key of a single S-box, namely sub-key $K_{16,i}$ for the i-th S-box $S_i$.

The (white box) attacker can change encoded nibbles in $\rho_{R,15}$, but he does not know which encodings are used. Therefore we assume that, for each of the 8 encoded nibbles, the attacker performs $2^8-1$ different perturbations and finds for each perturbation which 6-bit sub-keys $K_i$ (from now on $K_i$ stands for the i-th 6-bit sub-key in the last round, not for the i-th 56-bit round key) solve $$(P^{-1}O_{R,16})_i\oplus(P^{-1}\tilde{O}_{R,16})_i=S_i(K_i\oplus(E(O_{L,16}))_i)S_i(K_i\oplus(E(\tilde{O}_{L,16}))_i), \quad (3)$$

where the subscript i indicates taking the i-th nibble, S-box or bit sextet. Equation 3 is equivalent to $$(P^{-1}\phi_{R,16}(\tilde{\sigma}_{R,16},\tau_{R,16}))_i=S_i(K_i\oplus(E(O_{L,16}))_i)\oplus S_i(K_i\oplus(E(\tilde{O}_{L,16}))_i)\oplus S_i(K_{16,i}\oplus(E(O_{L,16}))_i)\oplus S_i(K_{16,i}\oplus(E(\tilde{O}_{L,16}))_i). \quad (4)$$

We want to make sure that the attacker doesn't learn anything form this.

It would be advantageous if the attacker should never see a change at a position where he does not expect it: for if he were to see such a change, he would conclude that it is not compatible with DES, and he could simply ignore it in the analysis.

It would be also be advantageous that all changes are consistent with some keys, but no key should be preferred. We do this by ensuring that for each j it holds that if the attacker performs the $2^8-1$ perturbations of the j-th encoded nibble of $\rho_{R,15}$, and finds from eq. 3 the keys that are consistent with each of these changes, he effectively solves eq. 4 for all 16 values of $(P^{-1}\phi_{R,16}(\tilde{\sigma}_{R,16},\tau_{R,16}))_i$, and thus finds all 64 possible sub-keys. In particular, for the 15 changes of the j-th nibble of $\rho_{R,15}$ where $\omega_{R,15}$ is changed, i.e., $\tilde{\omega}_{R,15}\neq\omega_{R,15}$, and $\sigma_{R,15}$ remains unchanged, i.e., $\tilde{\sigma}_{R,15}=\sigma_{R,15}=\tau_{R,15}$, it will hold that $\tilde{\sigma}_{R,16}=\tau_{R,16}$ and thus $\phi_{R,16}(\tilde{\sigma}_{R,16},\tau_{R,16})=0$. For these perturbations, the real key $K_i=K_{16,i}$ is a solution. For the other perturbations, other keys (and not the real key) should appear as a solution.

In an embodiment, the evolution of σ and the function $\phi_{R,16}$ is designed such that the following conditions hold:

1. in the sigma evolution in the last round only the right nibbles (as follows from the structure of E) are affected.

2. $\phi_{R,16}$ must be chosen such that $(\phi_{R,16}(\tilde{\sigma}_{R,16},\tau_{R,16}))_i$ takes all $2^4$ possible 4-bit values when $(\sigma_{R,15})_j$ runs over all $2^4$ possible values.

These requirements are satisfied for any 32-bit 'sigma'-key $K_\sigma$ when $$g(\sigma,K_\sigma)=\pi_1((K_\sigma)_1\oplus N_1(\sigma))\|\pi_2((K_\sigma)_2\oplus N_2(\sigma))\|\ldots\|\pi_8((K_\sigma)_8\oplus N_8(\sigma)),$$

where the $\pi_i$ are arbitrary bijections on bit strings of length 4 and $$N_i(\sigma) = \bigoplus_{j=1}^{8} \varepsilon_{i,j}\sigma_j,$$

where $\varepsilon_{i,j}=1$ if the j-th nibble of $R_{15}$ affects the input of the i-th S-box, and 0 otherwise, and when $$\phi(\sigma,\tau)=\phi_{L,16}(\sigma,\tau)=\phi_{R,16}(\sigma,\tau)=\sigma\oplus\tau.$$

The key $K_O$ may be omitted. Other choices for the tamper resistance shift function $\phi$ are possible.

With these example choices, the DFA fails to give information about any single sub-key. If the nibble j and S-box i are chosen such that in DES a change in nibble j does not affect the input of $S_i$, then there is no change in the output nibble, and any key solves (3). If it does affect, every $K_j$ solves (3) for 15 perturbations.

Note that In an alternative implementation of DES, the permutation P is moved from behind the S-box to before the expansion E. This defense works in this implementation as well, with minor modifications.

A more capable attacker may be defended against by choosing k>1. Above, the attacker was assumed to target one sub-key at a time. This attacked could be countered by making sure that the variations in the sigma of a single nibble of $\rho_{R,15}$ would lead to a modified S-box output, in such a way that all possible outputs appeared for all affected S-boxes.

By doing so, however, the changes in outputs for different affected S-boxes are related, as they depend on the same sigma-bits, and this may be exploited in an attack in which multiple, say m, sub-keys are searched for simultaneously. Such an attack requires keeping score of $2^{6m}$ sub-key-combinations. To have enough space to allow for unrelated changes in m different S-box outputs, one may choose k≥m so that enough sigma-bits are available.

Figure 7:
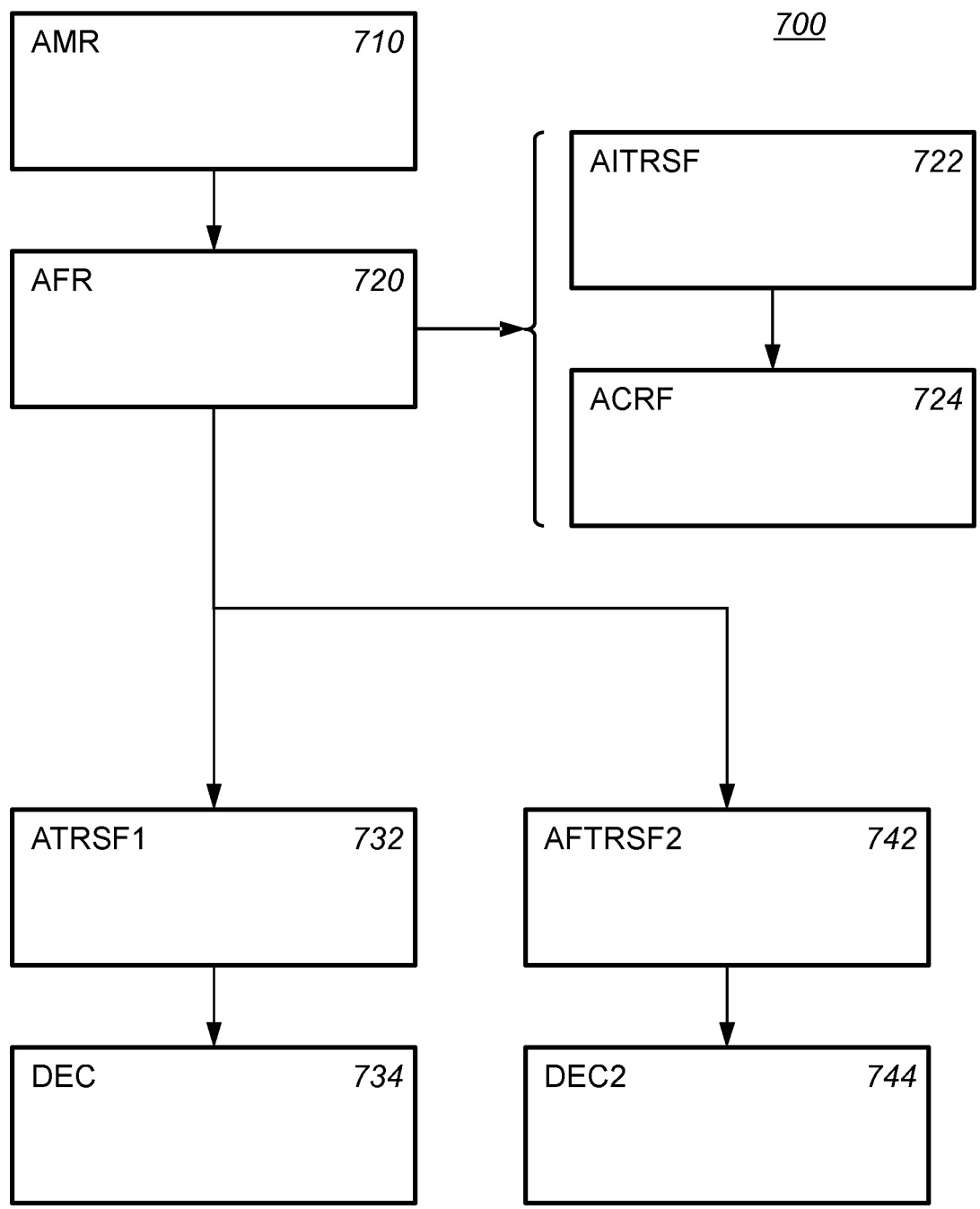

FIG. 7 schematically shows an example of an embodiment of a method for calculating a block cipher 700.

The cryptographic method calculates a block cipher (500) on a block cipher input (105) and produces a block cipher output (106), said block cipher calculation operating on encoded values (210), an encoded value (210) being an cryptographic and reversible encoding of a data value ($\omega$, 212) together with a state value ($\sigma$, 214).

Method 700 comprises applying 710 (AMR) multiple rounds (112, 114, 116, 118) of cryptographic processing on an encoding of the block cipher input (108), implementing the block cipher, for example, the this may be done by a processor or other hardware arranged therefore, applying 720 (AFR) a final round (118) of the multiple rounds of cryptographic processing implementing the block cipher, the input to the final round (118) of the multiple rounds comprising a first encoded input ($\lambda_{L,15}=E_{L,15}(\omega_{L,15}, \sigma_{L,15})$, 120), encoding first data-input ($\omega_{L,15}$, 122) and first state-input ($\sigma_{L,15}$, 124), and a second encoded input ($\rho_{R,15}=E_{R,15}(\omega_{R,15},\sigma_{R,15})$, 130), encoding second data-input ($\omega_{R,15}$, 132), and second state-input ($\sigma_{R,15}$, 134), For example, the final round may comprise applying 722 (AITRSF) ($\omega_{R,15}\oplus\phi(\sigma_{R,15},\tau_{R,15})$) an internal tamper-resistance shift function ($\phi(\sigma_{R,15},\tau_{R,15})$, 320) to the data-value (132) of the second encoded input (130), a tamper-resistance shift function ($\phi(\sigma,\tau)$, 220) modifying the data-value ($\omega$, 212) in an encoded value (210) in case the state-value ($\sigma$, 214) in the encoded value (210) does not equal an expected state-value ($\tau$, 222) and not modifying the data-value ($\omega$, 212) otherwise, and applying 724 (ACRF) a cryptographic round function (f, g, 342, 344) acting on the data-input (132) and state-input (134) of said shifted second encoded input (130) to produce an encoded output ($\omega_{R,16}=\omega_{L,15}\oplus f(\omega_{R,15}\oplus\phi(\sigma_{R,15},\tau_{R,15})$, $K_{16}$), $\sigma_{R,16}$, 150), The output of the method may be generated by two output generating applications. These may be executed in either order.

applying 732 (ATRSF1) a first output tamper-resistance shift function ($\phi_{L,16}(\sigma_{L,16},\tau_{L,16})$, 420) to the second encoded input ($\omega_{R,15},\sigma_{R,15}$, 130), followed by decoding 734 (DEC1) the data-value (132) to obtain a first part (162) of the block cipher output (106), applying 742 (ATRSF2) a second output tamper-resistance shift function ($\phi_{R,16}(\sigma_{R,16},\tau_{R,16})$, 520) to the encoded output ($\omega_{R,16},\sigma_{R,16}$, 150), followed by decoding 744 (DEC2) the data-value (152) to obtain a second part (182) of the block cipher output (106).

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 732 and 742 may be executed, at least partially, in parallel. Moreover, a given step may not have finished completely before a next step is started.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 8A:
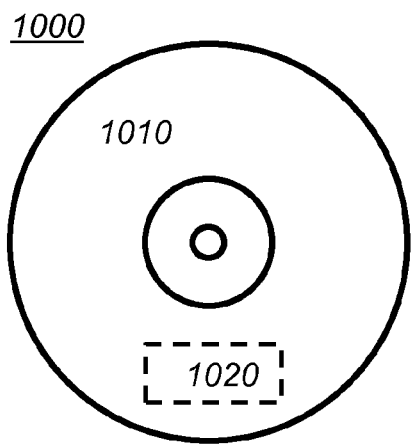

FIG. 8a shows a computer readable medium 1000 having a writable part 1010 comprising a computer program 1020, the computer program 1020 comprising instructions for causing a processor system to perform a method of calculating a block cipher, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of calculating a block cipher.

Figure 8B:
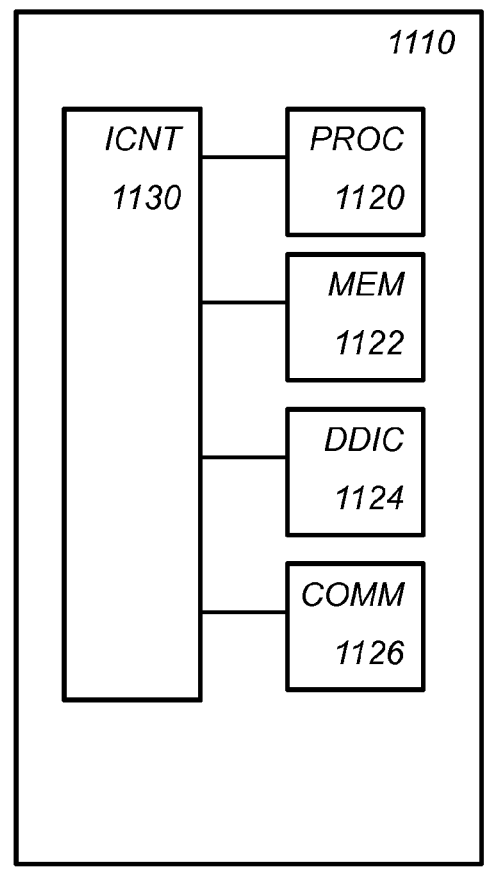

FIG. 8b shows in a schematic representation of a processor system 1100 according to an embodiment. The processor system comprises one or more integrated circuits 1110. The architecture of the one or more integrated circuits 1110 is schematically shown in FIG. 8b. Circuit 1110 comprises a processing unit 1120 (PROC), e.g., a CPU, for running computer program components to execute a method according to an embodiment and/or implement its modules or units. Circuit 1110 comprises a memory 1122 (MEM) for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 (DDIC) for performing part or all of the processing defined in the method. Processor 1120, memory 1122, dedicated IC 1124 and communication element 1126 (COMM) may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A cryptographic device for calculating a Feistel-type block cipher on a block cipher input and producing a block cipher output, said block cipher calculation operating on encoded values, an encoded value being a cryptographic and reversible encoding of a data value together with a state value, the cryptographic device being arranged to apply multiple rounds of cryptographic processing on an encoding of the block cipher input, implementing the block cipher, the cryptographic device comprising one or more hardware processors arranged to:

apply a final round of the multiple rounds of cryptographic processing implementing the block cipher, an input to the final round of the multiple rounds comprising a first encoded input ($\lambda_{L,15}=E_{L,15}(\omega_{L,15},\sigma_{L,15})$), encoding first data-input ($\omega_{L,15}$) and first state-input ($\sigma_{L,15}$), and a second encoded input ($\rho_{R,15}=E_{R,15}(\omega_{R,15},\sigma_{R,15})$) encoding second data-input ($\omega_{R,15}$), and second state-input ($\sigma_{R,15}$), apply ($\omega_{R,15}\oplus\phi(\sigma_{R,15},\tau_{R,15})$) an internal tamper-resistance shift function $\phi(\sigma_{R,15},\tau_{R,15})$ to the second data-input of the second encoded input followed by a cryptographic round function (f, g) acting on said shifted second encoded input to produce an encoded output ($\omega_{R,16}=\omega_{L,15}\oplus f(\omega_{R,15}\oplus\phi(\sigma_{R,15},\tau_{R,15}), K_{16}), \sigma_{R,16}$), wherein:

a diffusion of the data value ($\omega_{R,15}$) of the encoded input and the output data value ($\omega_{R,16}$) is the same as a diffusion of the state values ($\omega_{R,15}$) of the encoded input and output state value ($\omega_{R,16}$) of the final round, the tamper-resistant shift function $\phi(\sigma_{R,15},\tau_{R,15})$ modifies the data value ($\omega_{R,15}$) in an encoded value in case the state value ($\sigma_{R,15}$) in the encoded value does not equal an expected state value ($\tau_{R,15}$) and does not modify the data value ($\omega_{R,15}$) otherwise, the one or more hardware processors are further arranged to apply a first output tamper-resistance shift function ($\phi_{L,16}(\sigma_{L,16},\tau_{L,16})$) to the second encoded input ($\omega_{R,15}, \sigma_{R,15}$) which modifies the data value ($\omega_{R,15}$) in an encoded value in case the state value ($\sigma_{R,15}$) does not equal the expected state ($\tau_{R,15}$) and does not modify the data value ($\omega_{R,15}$) otherwise, followed by decoding said shifted second data value ($\omega_{R,15}$) to obtain a first part of the block cipher output, and the one or more hardware processors are further arranged to receive the encoded output ($\omega_{R,16},\sigma_{R,16}$), and to apply a second output tamper-resistance shift function ($\phi_{R,16}(\sigma_{R,16},\tau_{R,16})$) to the encoded output ($\omega_{R,16},\sigma_{R,16}$) which modifies the data value ($\omega_{R,16}$) in an encoded value in case the state value ($\sigma_{R,16}$) does not equal the expected state ($\tau_{R,16}$) and does not modify the data value ($\omega_{R,16}$) otherwise, followed by decoding the data value ($\omega_{R,16}$) to obtain a second part of the block cipher output, where ($\tau_{R,15}$) is a second encoded expected state value in round 15 and ($K_{16}$) is a round 16 key, ($\tau_{L,16}$) is a round 16 first encoded expected state value, and $\oplus$ is an XOR-function.

2. The cryptographic device as in claim 1, wherein an encoded value comprises a sequence of encoded sub-values, an encoded sub-value being a cryptographic and reversible encoding of a data sub-value ($\omega_i$) together with a corresponding state sub-value ($\sigma_i$) into a single encoded sub-value, a tamper-resistance shift function ($\phi(\sigma,\tau)$) comprising a sequence of tamper-resistance shift sub-functions ($\phi(\sigma,\tau)_i$) for modifying the respective data sub-value ($\omega_i$) in an encoded value.

3. The cryptographic device as in claim 2, wherein each tamper-resistance shift sub-function of the second output tamper-resistance shift function ($\phi_{R,16}(\sigma_{R,16},\tau_{R,16})_i$) is arranged such that if a state sub-value of the second encoded input ($\rho_{R,15}$) takes on all state values then the second output tamper-resistance shift function ($\phi_{R,16}(\tau_{R,16},\tau_{R,16})_i$) takes on all data sub-values.

4. The cryptographic device as in claim 1, wherein the one or more hardware processors are further arranged to add the first data-input ($\omega_{L,15}$) of the first encoded input ($\lambda_{L,15}=E_{L,15}(\omega_{L,15},\sigma_{L,15})$), to the data value of the result of the cryptographic round function ($\omega_{R,16}=\omega_{L,15}\oplus f(\omega_{R,15}\oplus\phi(\sigma_{R,15},\tau_{R,15}), K_{16}), \sigma_{R,16}$).

5. The cryptographic device as in claim 1, wherein the one or more hardware processors are further arranged to apply a data round function (f) to said shifted data value and to apply a state round function (g) to the second state-input of the second encoded input ($\rho_{R,15}$).

6. The cryptographic device as in claim 1, wherein the block cipher has a Feistel structure.

7. The cryptographic device as in claim 1, wherein computation on the state value in the encoded block cipher input is a Feistel structure.

8. The cryptographic device as in claim 6, wherein the block cipher is DES or Triple Des.

9. The cryptographic device as in claim 5, wherein the state round function (g) is $$g(\sigma) = \pi_1(N_1(\sigma)) \| \pi_2(N_2(\sigma)) \| \ldots \| \pi_8(N_8(\sigma)),$$

wherein the $\pi_i$ are bijections on state values, and $$N_i(\sigma) = \bigoplus_{j=1}^{8} \varepsilon_{i,j} \sigma_j,$$

wherein $\varepsilon_{i,j}=1$ if the j-th data value in $\omega_{R,15}$ affects the input of an i-th S-box, and 0 otherwise, or $$g(\sigma, K_\sigma) = \pi_1((K_\sigma)_1 \oplus N_1(\sigma)) \| \pi_2((K_\sigma)_2 \oplus N_2(\sigma)) \| \ldots \| \pi_8((K_\sigma)_8 \oplus N_8(\sigma))$$

wherein $K_\sigma$ is a state key.

10. The cryptographic device as in claim 1, wherein a tamper-resistance shift function ($\phi(\sigma,\tau)$) modifies the data value in the encoded value by adding the difference between the state value in the encoded value and the expected state value to said data value.

11. The cryptographic device as in claim 1, wherein the internal tamper-resistance shift function, and the first and second output tamper-resistance shift function are the same function.

12. The cryptographic device as in claim 1, wherein state and data values have a bit-size, the bit-size of state value being a multiple of the bit-size of data values.

13. A data encryption standard (DEC) cryptographic method for calculating a Feistel-type block cipher on a block cipher input and producing a block cipher output, said block cipher calculation operating on encoded values, an encoded value being a cryptographic and reversible encoding of a data value together with a state value, the method comprising:

applying multiple rounds of cryptographic processing on an encoding of the block cipher input, implementing the block cipher, applying a final round of the multiple rounds of cryptographic processing implementing the block cipher, the input to the final round of the multiple rounds comprising a first encoded input ($\lambda_{L,15} = E_{L,15}(\omega_{L,15}, \sigma_{L,15})$), encoding first data-input ($\omega_{L,15}$) and first state-input ($\sigma_{L,15}$), and a second encoded input ($\rho_{R,15} = E_{R,15}(\omega_{R,15} \oplus \phi(\sigma_{R,15}, \tau_{R,15}))$), encoding second data-input ($\omega_{R,15}$) and second state-input ($\sigma_{R,15}$), applying ($\omega_{R,15} \oplus \phi(\sigma_{R,15}, \tau_{R,15})$) an internal tamper-resistance shift function ($\phi(\sigma_{R,15}, \tau_{R,15})$) to the data value of the second encoded input followed by applying a cryptographic round function (f, g) acting on said shifted data-input to produce an encoded output ($\omega_{R,16} = \omega_{L,15} \oplus f(\omega_{R,15} \oplus \phi(\tau_{R,15}, \tau_{R,15}), K_{16}), \sigma_{R,16}$), wherein:

a diffusion of the data value ($\omega_{R,15}$) of the encoded input and the output data value ($\omega_{R,16}$) is the same as a diffusion of the state values ($\sigma_{R,15}$) of the encoded input and output state value ($\sigma_{R,16}$) of the final round, the tamper-resistant shift function $\phi(\sigma_{R,15}, \tau_{R,15})$ modifies the data value ($\omega_{R,15}$) in an encoded value in case the state value ($\sigma_{R,15}$) in the encoded value does not equal an expected state value ($\tau_{R,15}$) and does not modify the data value ($\omega_{R,15}$) otherwise, applying a first output tamper-resistance shift function ($\phi_{L,16}(\sigma_{L,16}, \tau_{L,16})$) to the second encoded input ($\omega_{R,15}, \sigma_{R,15}$) which modifies the data value ($\omega_{R,15}$) in an encoded value in case the state value ($\sigma_{R,15}$) does not equal the expected state ($\tau_{R,15}$) and does not modify the data value ($\omega_{R,15}$) otherwise, followed by decoding the data value ($\omega_{R,15}$) to obtain a first part of the block cipher output, applying a second output tamper-resistance shift function ($\phi_{R,16}(\sigma_{R,16}, \tau_{R,16})$) to the encoded output ($\omega_{R,16}, \sigma_{R,16}$) which modifies the data value ($\omega_{R,16}$) in an encoded value in case the state value ($\sigma_{R,16}$) does not equal the expected state ($\tau_{R,16}$) and does not modify the data value ($\omega_{R,16}$) otherwise, followed by decoding the data value ($\omega_{R,16}$) to obtain a second part of the block cipher output, where ($\tau_{R,15}$) is a second encoded expected state value in round 15 and ($K_{16}$) is a round 16 key, ($\tau_{L,16}$) is a round 16 first encoded expected state value, and $\oplus$ is an XOR-function.

14. A non-transitory computer readable medium storing a software configured to control a computer to calculate a Feistel-type block cipher on a block cipher input and producing a block cipher output, said block cipher calculation operating on encoded values, an encoded value being a cryptographic and reversible encoding of a data value ($\omega$) together with a state value ($\sigma$) including the steps of:

applying multiple rounds of cryptographic processing on an encoding of the block cipher input, implementing the block cipher, applying a final round of the multiple rounds of cryptographic processing implementing the block cipher, the input to the final round of the multiple rounds comprising a first encoded input ($\lambda_{L,15} = E_{L,15}(\omega_{L,15}, \sigma_{L,15})$), encoding first data-input ($\omega_{L,15}$) and first state-input ($\sigma_{L,15}$), and a second encoded input ($\rho_{R,15} = E_{R,15}(\omega_{R,15}, \sigma_{R,15})$), encoding second data-input ($\omega_{R,15}$), and second state-input ($\sigma_{R,15}$), applying ($\omega_{R,15} \oplus \phi(\sigma_{R,15}, \tau_{R,15})$) an internal tamper-resistance shift function ($\phi(\sigma_{R,15}, \tau_{R,15})$) to the data value of the second encoded input followed by applying a cryptographic round function (f,g) acting on said shifted data-input to produce an encoded output ($\omega_{R,16} = \omega_{L,15} \oplus f(\omega_{R,15} \oplus \phi(\tau_{R,15}, \tau_{R,15}), K_{16}), \sigma_{R,16}$), wherein:

a diffusion of the data value ($\omega_{R,15}$) of the encoded input and the output data value ($\omega_{R,16}$) is the same as a diffusion of the state values ($\sigma_{R,15}$) of the encoded input and output state value of the final round, the tamper-resistance shift function $\phi(\sigma_{R,15}, \tau_{R,15})$ modifies the data value ($\omega_{R,15}$) in an encoded value in case the state value ($\sigma_{R,15}$) in the encoded value does not equal an expected state value ($\tau_{R,15}$) and does not modify the data value ($\omega_{R,15}$) otherwise, applying a first output tamper-resistance shift function ($\phi_{L,16}, \tau_{L,16}$)) to the second encoded input ($\omega_{R,15}, \sigma_{R,15}$) which modifies the data value ($f_{R,15}$) in an encoded value in case the state value ($\sigma_{R,15}$) does not equal the expected state ($\tau_{R,15}$) and does not modify the data value ($\omega_{R,15}$) otherwise, followed by decoding the data value ($\omega_{R,15}$) to obtain a first part of the block cipher output, applying a second output tamper-resistance shift function $(\phi_{R,16}(\sigma_{R,16},\tau_{R,16}))$ to the encoded output $(\omega_{R,16},\sigma_{R,16})$ which modifies the data value $(\omega_{R,16})$ in an encoded value in case the state value $(\sigma_{R,16})$ does not equal the expected state $(\tau_{R,16})$ and does not modify the data value $(\omega_{R,16})$ otherwise, followed by decoding the data value $(\omega_{R,16})$ to obtain a second part of the block cipher output, where $(\tau_{R,15})$ is a second encoded expected state value in round 15 and $(K_{16})$ is a round 16 key, $(\tau_{L,16})$ is a round 16 first encoded expected state value, and $\oplus$ is an XOR-function.

15. A cryptographic device for calculating a Feistel-type block cipher on a block cipher input and producing a block cipher output, said block cipher calculation operating on encoded values, an encoded value being a cryptographic and reversible encoding of a data value together with a state value, the cryptographic device being arranged to apply multiple rounds of cryptographic processing on an encoding of the block cipher input, implementing the block cipher, the cryptographic device comprising one or more hardware processors configured to:

apply multiple rounds of cryptographic processing on an encoding of the block cipher input, implementing the block cipher, apply a final round of the multiple rounds of cryptographic processing implementing the block cipher, the input to the final round of the multiple rounds comprising a first encoded input $(\lambda_{L,15}=E_{L,15}(\omega_{L,15},\sigma_{L,15}))$, encoding first data-input $(\omega_{L,15})$ and first state-input $(\lambda_{L,15})$, and a second encoded input $(\rho_{R,15}=E_{R,15}(\omega_{R,15},\sigma_{R,15}))$, encoding second data-input $(\omega_{R,15})$, and second state-input $(\sigma_{R,15})$, apply $(\omega_{R,15}\oplus\phi(\sigma_{R,15},\tau_{R,15}))$ an internal tamper-resistance shift function $\phi(\sigma_{R,15},\tau_{R,15})$ to the data value of the second encoded input followed by applying a cryptographic round function (f,g) acting on said shifted data-input to produce an encoded output $(\omega_{R,16}=\omega_{L,15}\oplus f(\omega_{R,15}\oplus\phi(\sigma_{R,15},\tau_{R,15}), K_{16}), \sigma_{R,16})$, wherein:

a diffusion of the data value $(\omega_{R,15})$ of the encoded input and the output data value $(\omega_{R,16})$ is the same as a diffusion of the state values $(\sigma_{R,15})$ of the encoded input and output state value $(\sigma_{R,16})$ of the final round, the tamper-resistant shift function $\phi(\sigma_{R,15},\tau_{R,15})$ modifies the data value $(\omega_{R,15})$ in an encoded value in case the state value $(\sigma_{R,15})$ in the encoded value does not equal an expected state value $(\tau_{R,15})$ and does not modify the data value $(\omega_{R,15})$ otherwise, apply a first output tamper-resistance shift function $(\phi_{L,16}(\sigma_{L,16},\tau_{L,16}))$ to the second encoded input $(\omega_{R,15}, \sigma_{R,15})$ which modifies the data value $(\omega_{R,15})$ in an encoded value in case the state value $(\sigma_{R,15})$ does not equal the expected state $(\tau_{R,15})$ and does not modify the data value $(\sigma_{R,15})$ otherwise, followed by decoding the data value $(\omega_{R,15})$ to obtain a first part of the block cipher output, apply a second output tamper-resistance shift function $(\phi_{R,16}(\sigma_{R,16},\tau_{R,16}))$ to the encoded output $(\omega_{R,16},\tau_{R,16})$ which modifies the data value $(\omega_{R,16})$ in an encoded value in case the state value $(\sigma_{R,16})$ does not equal the expected state $(\tau_{R,16})$ and does not modify the data value $(\omega_{R,16})$ otherwise, followed by decoding the data value $(\omega_{R,16})$ to obtain a second part of the block cipher output, where $(\tau_{R,15})$ is a second encoded expected state value in round 15 and $(K_{16})$ is a round 16 key, $(\tau_{L,16})$ is a round 16 first encoded expected state value, and $\oplus$ is an XOR-function.

16. A cryptographic device for calculating a Feistel-type block cipher on a block cipher input and producing a block cipher output, the cryptographic device comprising:

a computer; and a non-transitory computer readable medium storing a software configured to control the computer to calculate the Feistel-type block cipher on the block cipher input and produce the block cipher output, said block cipher calculation operating on encoded values, an encoded value being a cryptographic and reversible encoding of a data value $(\omega)$ together with a state value $(\sigma)$, including the steps of:

apply multiple rounds of cryptographic processing on an encoding of the block cipher input, implementing the block cipher, apply a final round of the multiple rounds of cryptographic processing implementing the block cipher, the input to the final round of the multiple rounds comprising a first encoded input $(\sigma_{L,15}=E_{L,15}(\omega_{L,15},\sigma_{L,15}))$, encoding first data-input $(\omega_{L,15})$ and first state-input $(\sigma_{L,15})$, and second state-input encoded input $(\rho_{R,15}=E_{R,15}(\omega_{R,15},\sigma_{R,15}))$, encoding second data-input $(\omega_{R,15})$, and second state-input $(\sigma_{R,15})$, apply $(\omega_{R,15}\oplus\phi(\sigma_{R,15},\tau_{R,15}))$ an internal tamper-resistance shift function $\phi(\sigma_{R,15},\tau_{R,15})$ to the data value of the second encoded input followed by applying a cryptographic round function (f, g) acting on said shifted data-input to produce an encoded output $(\omega_{R,16}=\omega_{L,15}\oplus f(\omega_{R,15},\tau_{R,15}), K_{16}), \sigma_{R,16})$, wherein:

a diffusion of the data value $(\omega_{R,15})$ of the encoded input and the output data value $(\omega_{R,16})$ is the same as a diffusion of the state values $(\sigma_{R,15})$ of the encoded input and output state value $(\sigma_{R,16})$ of the final round, the tamper-resistant shift function $\phi(\sigma_{R,15},\tau_{R,15})$ modifies the data value $(\omega_{R,15})$ in an encoded value in case the state value $(\sigma_{R,15})$ in the encoded value does not equal an expected state value $(\tau_{R,15})$ and does not modify the data value $(\omega_{R,15})$ otherwise, apply a first output tamper-resistance shift function $(\phi_{L,15}(\sigma_{L,15},\tau_{L,15}))$ to the second encoded input $(\omega_{R,15}, \sigma_{R,15})$ which modifies the data value $(\omega_{R,15})$ in an encoded value in case the state value $(\sigma_{R,15})$ does not equal the expected state $(\tau_{R,15})$ and does not modify the data value $(\omega_{R,15})$ otherwise, followed by decoding the data value $(\omega_{R,15})$ to obtain a first part of the block cipher output, apply a second output tamper-resistance shift function $(\phi_{R,16}(\sigma_{R,16},\tau_{R,16}))$ to the encoded output $(\omega_{R,16},\sigma_{R,16})$ which modifies the data value $(\omega_{R,16})$ in an encoded value in case the state value $(\sigma_{R,16})$ does not equal the expected state $(\tau_{R,16})$ and does not modify the data value $(\omega_{R,16})$ otherwise, followed by decoding the data value $(\omega_{R,16})$ to obtain a second part of the block cipher output, where $(\tau_{R,15})$ is a second encoded expected state value in round 15 and $(K_{16})$ is a round 16 key, $(\tau_{L,16})$ is a round 16 first encoded expected state value, and $\oplus$ is an XOR-function.

* * * * *